(12) United States Patent
Hsueh et al.

(10) Patent No.: US 10,564,402 B2
(45) Date of Patent: *Feb. 18, 2020

(54) IMAGE CAPTURING LENS ASSEMBLY, IMAGING APPARATUS AND ELECTRONIC DEVICE

(71) Applicant: LARGAN PRECISION CO., LTD., Taichung (TW)

(72) Inventors: Chun-Che Hsueh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,820

(22) Filed: Feb. 6, 2019

(65) Prior Publication Data

US 2019/0187437 A1 Jun. 20, 2019

Related U.S. Application Data

(63) Continuation of application No. 15/682,654, filed on Aug. 22, 2017, now Pat. No. 10,241,305.

(30) Foreign Application Priority Data

Jan. 18, 2017 (TW) .............................. 106101652 A

(51) Int. Cl.
| | | |
|---|---|---|
| *G02B 13/00* | (2006.01) |
| *G02B 9/62* | (2006.01) |
| *G02B 3/04* | (2006.01) |
| *G02B 13/18* | (2006.01) |

(52) U.S. Cl.
CPC ........... *G02B 13/0045* (2013.01); *G02B 3/04* (2013.01); *G02B 9/62* (2013.01); *G02B 13/18* (2013.01)

(58) Field of Classification Search
CPC ........ G02B 3/04; G02B 9/62; G02B 13/0045; G02B 13/18
USPC .......................................................... 359/713
See application file for complete search history.

(56) References Cited

U.S. PATENT DOCUMENTS

| | | | |
|---|---|---|---|
| 8,908,290 B1 | 12/2014 | Liao et al. | |
| 9,195,030 B2 | 11/2015 | Liao et al. | |
| 10,241,305 B2 * | 3/2019 | Hsueh | G02B 3/04 |

(Continued)

FOREIGN PATENT DOCUMENTS

| | | |
|---|---|---|
| CN | 101553748 A | 10/2009 |
| WO | 2018028026 A1 | 2/2018 |

*Primary Examiner* — Nicholas R. Pasko
(74) *Attorney, Agent, or Firm* — Locke Lord LLP; Tim Tingkang Xia, Esq.

(57) ABSTRACT

A image capturing lens assembly includes six lens elements, the six lens elements being, in order from an object side to an image side: a first lens element with positive refractive power having an object-side surface being convex thereof; a second lens element having negative refractive power; a third lens element; a fourth lens element; a fifth lens element with positive refractive power having an object-side surface being convex and an image-side surface being convex thereof; and a sixth lens element having an image-side surface being concave in a paraxial region thereof, the image-side surface having at least one convex critical point in an off-axial region thereof, and an object-side surface and the image-side surface being aspheric.

20 Claims, 19 Drawing Sheets

(56) References Cited

U.S. PATENT DOCUMENTS

| | | | |
|---|---|---|---|
| 2012/0188654 A1* | 7/2012 | Huang | G02B 9/62 |
| | | | 359/713 |
| 2016/0004050 A1* | 1/2016 | Tang | G02B 13/0045 |
| | | | 348/374 |
| 2016/0085052 A1* | 3/2016 | Park, II | G02B 13/0045 |
| | | | 359/713 |
| 2016/0109688 A1* | 4/2016 | Jo | G02B 13/0045 |
| | | | 348/373 |
| 2017/0031133 A1* | 2/2017 | Liu | G02B 27/646 |
| 2017/0031134 A1* | 2/2017 | Liu | G02B 13/06 |
| 2017/0052347 A1* | 2/2017 | Tang | G02B 9/62 |
| 2017/0153422 A1* | 6/2017 | Tang | G02B 9/62 |
| 2017/0153423 A1* | 6/2017 | Tang | G02B 7/04 |
| 2017/0160521 A1* | 6/2017 | Tang | G02B 5/005 |

* cited by examiner

US 10,564,402 B2

IMAGE CAPTURING LENS ASSEMBLY, IMAGING APPARATUS AND ELECTRONIC DEVICE

RELATED APPLICATIONS

This application is a continuation of U.S. application Ser. No. 15/682,654 filed on Aug. 22, 2017, now approved and claims priority to Taiwan Application Serial Number 106101652, filed on Jan. 18, 2017, which is incorporated by reference herein in its entirety.

BACKGROUND

Technical Field

The present disclosure relates to an image capturing lens assembly and an imaging apparatus, and more particularly, to an image capturing lens assembly and an imaging apparatus applicable to electronic devices.

Description of Related Art

With the increasing prevalence of smart electronics and developments in technology, users have a more demanding requirement on the photographing functions, such as taking pictures with wide view angle and depth of field effect. Therefore, there is a need for a lens unit of large view angle, large aperture and high resolution.

However, the requirement of compactness in smart electronics restricts the size and the volume of the camera equipped inside. Therefore, the lens must be arranged to meet the requirements for miniaturization, large aperture and large view angle concurrently. Unfortunately, the aberrations related to light in a peripheral region, such as chromatic aberration, are difficult to be corrected under the arrangement of a large aperture. Therefore, a different solution is required to meet the requirement.

SUMMARY

According to one aspect of the present disclosure, an image capturing lens assembly, comprises six lens elements, the six lens elements being, in order from an object side to an image side: a first lens element with positive refractive power having an object-side surface being convex thereof; a second lens element having negative refractive power; a third lens element; a fourth lens element; a fifth lens element with positive refractive power having an object-side surface being convex and an image-side surface being convex thereof; and a sixth lens element having an image-side surface being concave in a paraxial region thereof, the image-side surface having at least one convex critical point in an off-axial region thereof, and an object-side surface and the image-side surface being aspheric, wherein an Abbe number of the fourth lens element is V4, an Abbe number of the fifth lens element is V5, an Abbe number of the sixth lens element is V6, and the following condition is satisfied:

$V4+V5+V6<100$.

According to another aspect of the present disclosure, an image capturing lens assembly, comprises six lens elements, the six lens elements being, in order from an object side to an image side: a first lens element with positive refractive power having an object-side surface being convex thereof; a second lens element having negative refractive power; a third lens element; a fourth lens element; a fifth lens element with positive refractive power having an image-side surface being convex thereof; and a sixth lens element with negative refractive power having both an object-side surface and an image-side surface being aspheric, the image-side surface being concave in a paraxial region thereof and at least one convex critical point in an off-axial region of the image-side surface thereof, wherein a curvature radius of the object-side surface of the sixth lens element is R11, a curvature radius of the image-side surface of the sixth lens element is R12, an Abbe number of the fourth lens element is V4, an Abbe number of the fifth lens element is V5, an Abbe number of the sixth lens element is V6, and the following conditions are satisfied:

$-1.0<(R11+R12)/(R11-R12)\le1.0$;

$V4+V5+V6<100$.

According to another aspect of the present disclosure, an imaging apparatus comprises the aforementioned image capturing lens assembly and an image sensor disposed on an image surface of the image capturing lens assembly.

According to yet another aspect of the present disclosure, an electronic device comprises the aforementioned imaging apparatus.

DETAILED DESCRIPTION

Figure 1A:
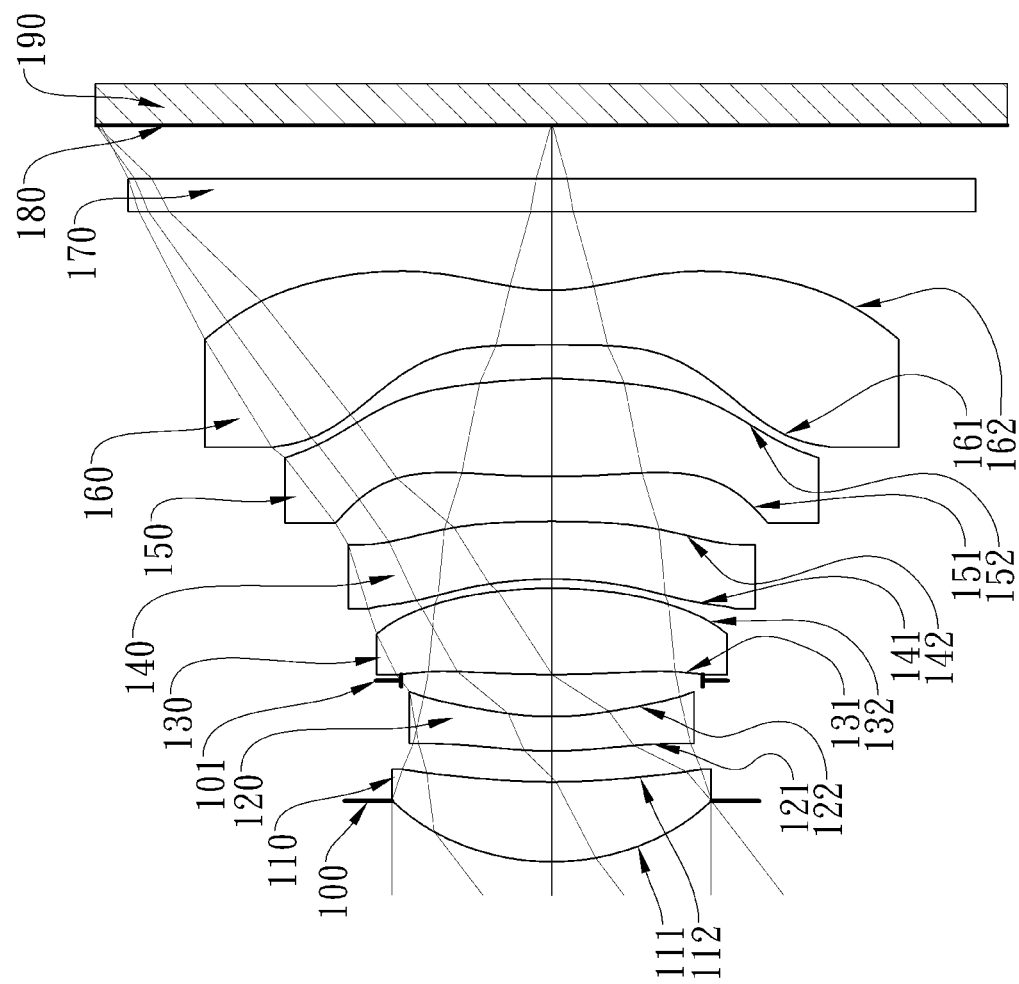
FIG. 1A is a schematic view of an imaging apparatus according to the 1st embodiment of the present disclosure.

The present disclosure provides an image capturing lens assembly including six lens elements, the six lens elements being, in order from an object side to an image side, a first lens element, a second lens element, a third lens element, a fourth lens element, a fifth lens element, and a sixth lens element.

The first lens element with positive refractive power having an object-side surface being convex thereof provides the system with sufficient converging power to keep the lens assembly miniaturized.

The second lens element with negative refractive power may have an object-side surface and an image-side surface both being aspheric, the image-side surface being concave in a paraxial region thereof and at least one convex critical point in an off-axial region of the image-side surface thereof for the light in the off-axial region with large view angle favorably converging onto the image surface to avoid imaging or manufacturing problems resulted from overly curved surfaces in the off-axial region.

The third lens element may have positive refractive power for improving the light converging power in an off-axial region. The third lens element may have an object-side surface and an image-side surface both being aspheric, and the object-side surface being convex in a paraxial region thereof and at least one concave critical point in an off-axial region of the object-side surface thereof for the light in the off-axial region with large view angle favorably converging onto the image surface to avoid the imaging or manufacturing problems resulted from overly curved surfaces in the off-axial region thereof.

The fourth lens element may have negative refractive power so as to enhance imaging in the peripheral region in cooperation with the positive refractive power of the third lens element, enlarge the view angle, and improve image resolution.

The fifth lens element with positive refractive power having an image-side surface being convex thereof may have an object-side surface being convex thereof to reduce the deviation of the focal points between a chief ray and marginal rays at each field of view while minimizing the spot size to increase the resolution. The fifth lens element may have the object-side surface and the image-side surface both being aspheric and at least one concave critical point in an off-axial region of the object-side surface thereof so as to improve the convergence of the peripheral light at large view angle onto the image surface and also avoid the imaging or manufacturing problems resulted from overly curved surfaces in the off-axial region thereof.

The sixth lens element has an object-side surface and an image-side surface being aspheric. The sixth lens element may have negative refractive power, the image-side surface being concave in a paraxial region thereof. The image-side surface may have at least one convex critical point in an off-axial region thereof so as to improve the convergence of the peripheral light at large angle of view for a clearer image on the image surface.

When an Abbe number of the fourth lens element is V4, an Abbe number of the fifth lens element is V5, an Abbe number of the sixth lens element is V6, and the following condition can be satisfied: V4+V5+V6<100, correction capability in longitudinal and lateral aberrations can be improved. Preferably, the following condition can be satisfied: 40<V4+V5+V6<85.

When a curvature radius of the object-side surface of the sixth lens element is R11, a curvature radius of the image-side surface of the sixth lens element is R12, and the following condition can be satisfied: (R11+R12)/(R11−R12)≤1.0, the back focal length can be favorably reduced for miniaturizing camera modules and balancing with the relatively higher refractive power of the fifth lens element. Besides, the following condition can also be satisfied: 0<(R11+R12)/(R11−R12)<1.5.

When an axial distance between the object-side surface of the first lens element and an image surface is TL, a maximum image height of the image capturing lens assembly is ImgH, an f-number of the image capturing lens assembly is Fno, and the following conditions can be satisfied: 0.80<TL/ImgH<1.80 and 1.20<Fno<2.30, the trend of compact lens assemblies with large apertures can be realized while enlarging the view angle.

When a sum of central thicknesses of the first lens element, the second lens element, the third lens element, the fourth lens element, the fifth lens element, and the sixth lens element is ΣCT, a sum of axial distances between every two adjacent lens elements of the image capturing lens assembly is ΣAT, and the following condition can be satisfied: 2.25<ΣCT/ΣAT<4.0, space utilization of the lens elements can be optimized more efficiently for lens miniaturization.

When a curvature radius of the object-side surface of the fifth lens element is R9, a curvature radius of the image-side surface of the fifth lens element is R10, and the following condition can be satisfied: 0.20<(R9+R10)/(R9−R10)<1.0, the shape arrangement of the fifth lens element becomes favorable for lens miniaturization while allowing sufficient space allocation for lens elements with larger effective radius near the image side.

When an axial distance between the first lens element and the second lens element is T12, a central thickness of the second lens element is CT2, and the following condition can be satisfied: 0.60<T12 ΣCT2<2.5, the second lens element can be favorably adjusted for the arrangement of large aperture or large angle of view.

When an Abbe number of the first lens element is V1, an Abbe number of the second lens element is V2, an Abbe number of the third lens element is V3, the Abbe number of the fourth lens element is V4, the Abbe number of the fifth lens element is V5, the Abbe number of the sixth lens element is V6, and the following condition can satisfied: 1.0<(V1+V3)/(V2+V4+V5+V6)<1.75, chromic aberration correction can be further improved as well as the image quality in the peripheral region.

When a focal length of the first lens element is f1, a focal length of the third lens element is f3, a focal length of the fifth lens element is f5, and the following conditions can be satisfied: |f3|<f1 and f5<f1, it is favorable for avoiding the first lens element having overly strong refractive power that makes the light at larger view angle converge too early to be on the image surface.

When a central thickness of the third lens element is CT3, a central thickness of the fourth lens element is CT4, and the following condition can be satisfied: CT3 ΣCT4<1.75, it is favorable for avoiding overly curved surfaces of the fourth lens element resulting reduced image quality from generation of the stray light and for favorably reducing noise with improved image quality.

When a focal length of the image capturing lens assembly is f, the focal length of the fifth lens element is f5, a focal length of the sixth lens element is f6, and the following condition can be satisfied: 2.50<(f/f5)+|f/f6|<7.0, it is favorable for enhancing the refractive power of the fifth lens element and the sixth lens element as well as chromic aberration correction.

When the focal length of the image capturing lens assembly is f, the focal length of the third lens element is f3, a focal length of the fourth lens element is f4, and the following condition can be satisfied: 1.25<|f/f3|+|f/f4|<3.0, it is favorable for balancing the lower refractive power of the first lens element and the second lens element with the higher refractive power of the fifth lens element and the sixth lens element to avoid imaging problems from high variation of the refractive power among different lens elements after the light entering the image capturing lens assembly.

When a focal length of the second lens element is f2, the focal length of the fourth lens element is f4, and the following condition can be satisfied: 0<f4/f2<1.0, the major portion of the negative refractive power can be arranged toward the image side to avoid aberrations such as chromic aberration being overly corrected.

When a total number of the lens elements in the image capturing lens assembly having an Abbe number less than 40 is VN40, and the following condition can be satisfied: 4≤VN40, it is favorable for enhancing chromic aberration correction and further improving image quality.

According to the image capturing lens assembly of the present disclosure, the lens elements thereof can be made of glass or plastic material. When the lens elements are made of glass material, the distribution of the refractive power of the image capturing lens assembly may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required quantity of lens elements, the total track length of the image capturing lens assembly can be effectively reduced.

According to the image capturing lens assembly of the present disclosure, the image capturing lens assembly can include at least one stop, such as an aperture stop, a glare stop or a field stop, so as to favorably reduce the amount of stray light and thereby improving the image quality.

According to the image capturing lens assembly of the present disclosure, an aperture stop can be configured as a front stop or a middle stop. A front stop disposed between an imaged object and the first lens element can provide a longer distance between the exit pupil and the image surface so that there is a telecentric effect for improving the image-sensing efficiency of an image sensor, such as a CCD or CMOS sensor. A middle stop disposed between the first lens element and the image surface is favorable for enlarging the field of view, thereby providing the image capturing lens assembly with the advantage of a wide-angle lens.

According to the image capturing lens assembly of the present disclosure, when a lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the image capturing lens assembly of the present disclosure, the image surface of the image capturing lens assembly, based on the corresponding image sensor, can be a plane or a curved surface with an arbitrary curvature, especially a curved surface being concave facing towards the object side.

According to the above description of the present disclosure, the following 1st-10th specific embodiments are provided for further explanation.

1st Embodiment

Figure 1B:
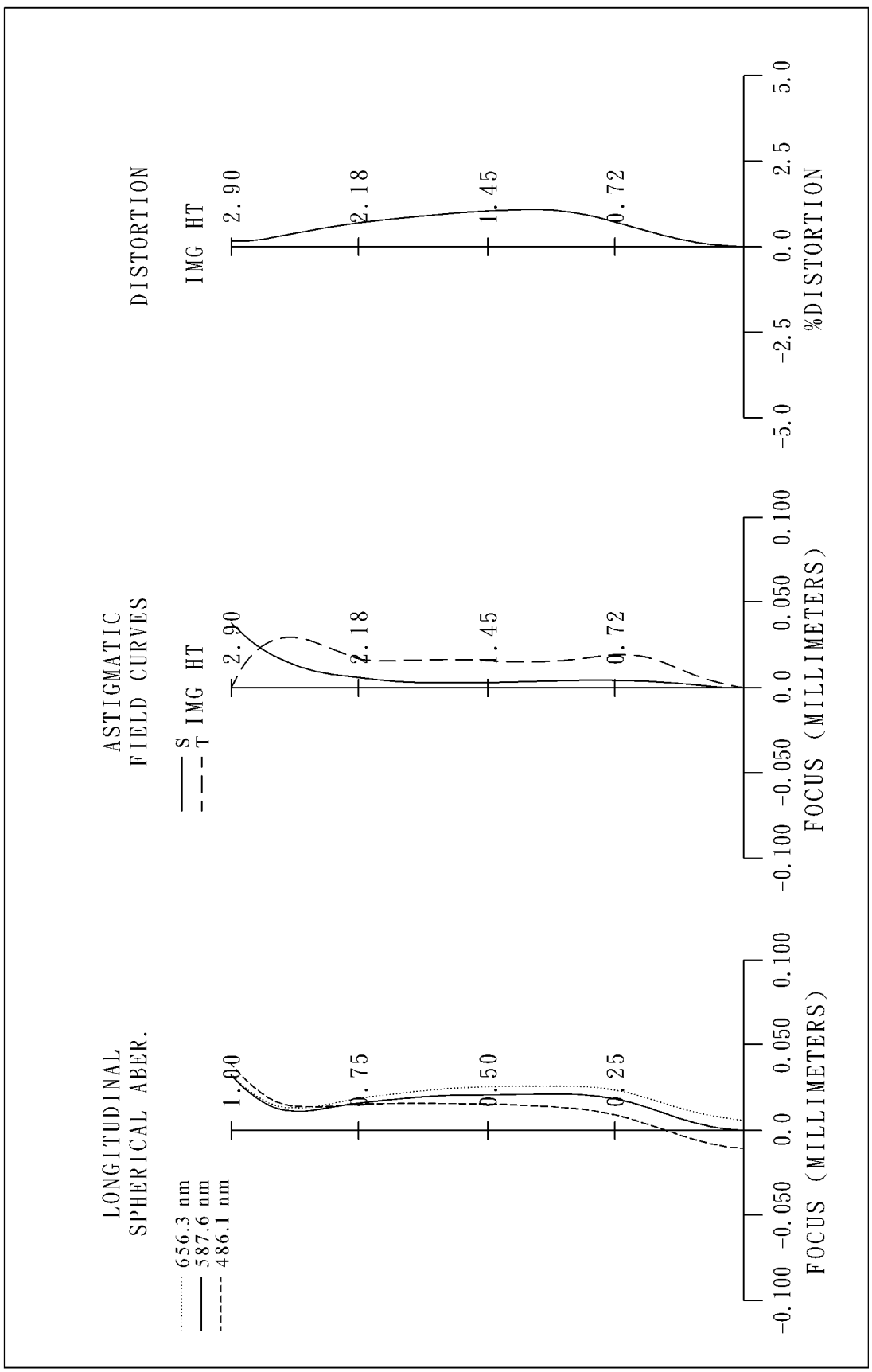
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an image capturing lens assembly (not otherwise herein labeled) of the present disclosure and an image sensor 190. The image capturing lens assembly includes, in order from an object side to an image side, an aperture stop 100, a first lens element 110, a second lens element 120, a stop 101, a third lens element 130, a fourth lens element 140, a fifth lens element 150, and a sixth lens element 160.

The first lens element 110 with positive refractive power has an object-side surface 111 being convex in a paraxial region thereof, an image-side surface 112 being concave in a paraxial region thereof, and both the object-side surface 111 and the image-side surface 112 being aspheric. The first lens element 110 is made of plastic material.

The second lens element 120 with negative refractive power has an object-side surface 121 being convex in a paraxial region thereof, an image-side surface 122 being concave in a paraxial region thereof, and both the object-side surface 121 and the image-side surface 122 being aspheric. The second lens element 120 is made of plastic material.

The third lens element 130 with positive refractive power has an object-side surface 131 being convex in a paraxial region thereof, an image-side surface 132 being convex in a paraxial region thereof, both the object-side surface 131 and the image-side surface 132 being aspheric, and at least one concave critical point in an off-axial region of the object-side surface 131 thereof. The third lens element 130 is made of plastic material.

The fourth lens element 140 with negative refractive power has an object-side surface 141 being concave in a paraxial region thereof, an image-side surface 142 being convex in a paraxial region thereof, and both the object-side surface 141 and the image-side surface 142 being aspheric. The fourth lens element 140 is made of plastic material.

The fifth lens element 150 with positive refractive power has an object-side surface 151 being convex in a paraxial region thereof, an image-side surface 152 being convex in a paraxial region thereof, both the object-side surface 151 and the image-side surface 152 being aspheric, and at least one concave critical point in an off-axial region of the object-side surface 151 thereof. The fifth lens element 150 is made of plastic material.

The sixth lens element 160 with negative refractive power has an object-side surface 161 being planar in a paraxial region thereof, an image-side surface 162 being concave in a paraxial region thereof, both the object-side surface 161 and the image-side surface 162 being aspheric, and at least one convex critical point in an off-axial region of the image-side surface 162 thereof. The sixth lens element 160 is made of plastic material.

The image capturing lens assembly further includes an IR cut filter 170 located between the sixth lens element 160 and an image surface 180. The IR cut filter 170 is made of glass material and will not affect the focal length of the image capturing lens assembly. The image sensor 190 is disposed on or near the image surface 180 of the image capturing lens assembly.

The detailed optical data of the 1st embodiment are shown in TABLE 1, and the aspheric surface data are shown in TABLE 2, wherein the units of the curvature radius, the thickness and the focal length are expressed in mm, and HFOV is a half of the maximal field of view.

TABLE 1

(1st Embodiment)
f = 3.76 mm, Fno = 1.85, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.388 | | | | |
| 2 | Lens 1 | 1.577 | ASP | 0.508 | Plastic | 1.545 | 56.1 | 4.48 |
| 3 | | 3.951 | ASP | 0.197 | | | | |
| 4 | Lens 2 | 2.409 | ASP | 0.220 | Plastic | 1.639 | 23.5 | −12.87 |
| 5 | | 1.797 | ASP | 0.230 | | | | |
| 6 | Stop | Plano | | 0.038 | | | | |
| 7 | Lens 3 | 6.826 | ASP | 0.550 | Plastic | 1.544 | 56.0 | 3.63 |
| 8 | | −2.697 | ASP | 0.059 | | | | |
| 9 | Lens 4 | −2.351 | ASP | 0.367 | Plastic | 1.671 | 19.3 | −5.10 |
| 10 | | −7.985 | ASP | 0.287 | | | | |
| 11 | Lens 5 | 5.917 | ASP | 0.624 | Plastic | 1.671 | 19.3 | 2.91 |
| 12 | | −2.790 | ASP | 0.214 | | | | |
| 13 | Lens 6 | ∞ | | 0.350 | Plastic | 1.633 | 23.4 | −2.06 |
| 14 | | 1.302 | | 0.500 | | | | |
| 15 | IR Cut Filter | Plano | | 0.210 | Glass | 1.517 | 64.2 | — |
| 16 | | Plano | | 0.341 | | | | |
| 17 | Image Surface | Plano | | — | | | | |

Reference wavelength is d-line 587.6 nm.
The effective radius of Surface 6 is 0.960 mm.

TABLE 2

Aspheric Coefficients

| Surface # | | | |
|---|---|---|---|
| 2 | 3 | 4 | 5 |
| k= 7.9167E−01 | −1.5123E+01 | −3.6926E+01 | −1.3315E+01 |
| A4= −2.4452E−02 | −7.3917E−02 | −3.1279E−02 | 4.7394E−03 |
| A6= −1.0117E−02 | 8.5589E−02 | −4.8528E−01 | −3.0258E−01 |
| A8= 9.5075E−03 | −3.8619E−02 | 1.3388E+00 | 9.1181E−01 |
| A10= −2.4953E−02 | 2.6333E−02 | −1.6299E+00 | −1.0304E+00 |
| A12= 1.7657E−02 | −2.8356E−02 | 9.8794E−01 | 5.6721E−01 |
| A14= −6.8207E−03 | 1.4325E−02 | −2.5707E−01 | −1.1929E−01 |

| Surface # | | | |
|---|---|---|---|
| 7 | 8 | 9 | 10 |
| k= 2.1076E+01 | −1.2915E+00 | −5.0039E−02 | −1.2079E+01 |
| A4= −3.9712E−02 | 2.1109E−01 | 1.8937E−01 | −6.6120E−02 |
| A6= −8.8807E−02 | −8.6419E−01 | −7.7389E−01 | −2.6857E−01 |
| A8= −2.6025E−02 | 1.3344E+00 | 1.4297E+00 | 6.8946E−01 |
| A10= 1.9852E−01 | −9.9380E−01 | −1.0596E+00 | −7.4247E−01 |
| A12= −2.2649E−01 | 3.1436E−01 | 2.0562E−01 | 4.5588E−01 |
| A14= 9.4615E−02 | −2.7511E−02 | 1.2297E−01 | −1.5022E−01 |
| A16= | | −5.1565E−02 | 2.0155E−02 |

| Surface # | | | |
|---|---|---|---|
| 11 | 12 | 13 | 14 |
| k= 1.3494E+00 | −1.8082E+01 | −1.0000E+00 | −7.5094E+00 |
| A4= 1.5539E−02 | 1.7415E−01 | −2.4517E−01 | −2.0283E−01 |
| A6= −2.3500E−01 | −3.8659E−01 | −5.5432E−02 | 1.1709E−01 |
| A8= 1.4487E−01 | 2.7403E−01 | 1.0919E−01 | −4.2121E−02 |
| A10= 9.1386E−03 | −1.0925E−01 | −2.9272E−02 | 9.7667E−03 |
| A12= −6.1091E−02 | 2.9679E−02 | −6.4748E−04 | −1.4748E−03 |

TABLE 2-continued

Aspheric Coefficients

| A14= | 2.7448E−02 | −5.1938E−03 | 1.1894E−03 | 1.2967E−04 |
| A16= | −3.5487E−03 | 4.1376E−04 | −1.2219E−04 | −4.8162E−06 |

The equation of the aspheric surface profiles is expressed as follows:

$$X(Y) = (Y^2/R)/\left(1 + \text{sqrt}\left(1 - (1+k)*(Y/R)^2\right)\right) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the image capturing lens assembly is f, an f-number of the image capturing lens assembly is Fno, a half of a maximal field of view of the image capturing lens assembly is HFOV, and these parameters have the following values: f=3.76 mm; Fno=1.85; and HFOV=37.5 degrees.

In the 1st embodiment, an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, and they satisfy the condition: (V1+V3)/(V2+V4+V5+V6)=1.31.

In the 1st embodiment, the Abbe number of the fourth lens element 140 is V4, the Abbe number of the fifth lens element 150 is V5, the Abbe number of the sixth lens element 160 is V6, and they satisfy the condition: V4+V5+V6=62.0.

In the 1st embodiment, a total number of the lens elements in the image capturing lens assembly having the Abbe number less than 40 is VN40, and it satisfies the condition: VN40=4.

In the 1st embodiment, a curvature radius of the object-side surface 151 of the fifth lens element 150 is R9, a curvature radius of the image-side surface 152 of the fifth lens element 150 is R10, and they satisfy the condition: (R9+R10)/(R9−R10)=0.36.

In the 1st embodiment, a curvature radius of the object-side surface 161 of the sixth lens element 160 is R11, a curvature radius of the image-side surface 162 of the sixth lens element 160 is R12, and they satisfy the condition: (R11+R12)/(R11−R12)=1.00.

In the 1st embodiment, an axial distance between the first lens element 110 and the second lens element 120 is T12, a central thickness of the second lens element 120 is CT2, and they satisfy the condition: T12 ΣCT2=0.90.

In the 1st embodiment, a central thickness of the third lens element 130 is CT3, a central thickness of the fourth lens element 140 is CT4, and they satisfy the condition: CT3 ΣCT4=1.50.

In the 1st embodiment, a sum of central thicknesses of the first lens element 110, the second lens element 120, the third lens element 130, the fourth lens element 140, the fifth lens element 150, and the sixth lens element 160 is ΣCT, a sum of axial distances between every two adjacent lens elements of the image capturing lens assembly is ΣAT, and they satisfy the condition: ΣCT/ΣAT=2.56.

In the 1st embodiment, an axial distance between the object-side surface 111 of the first lens element 110 and the image surface 180 is TL, a maximum image height of the image capturing lens assembly is ImgH, and they satisfy the condition: TL/ImgH=1.62.

In the 1st embodiment, a focal length of the second lens element 120 is f2, a focal length of the fourth lens element 140 is f4, and they satisfy the condition: f4/f2=0.40.

In the 1st embodiment, the focal length of the image capturing lens assembly is f, a focal length of the third lens element 130 is f3, the focal length of the fourth lens element 140 is f4, and they satisfy the condition: |f/f3|α|f/f4|=1.77.

In the 1st embodiment, the focal length of the image capturing lens assembly is f, a focal length of the fifth lens element 150 is f5, a focal length of the sixth lens element 160 is f6, and they satisfy the condition: (f/f5)+|f/f6|=3.12.

2nd Embodiment

Figure 2A:
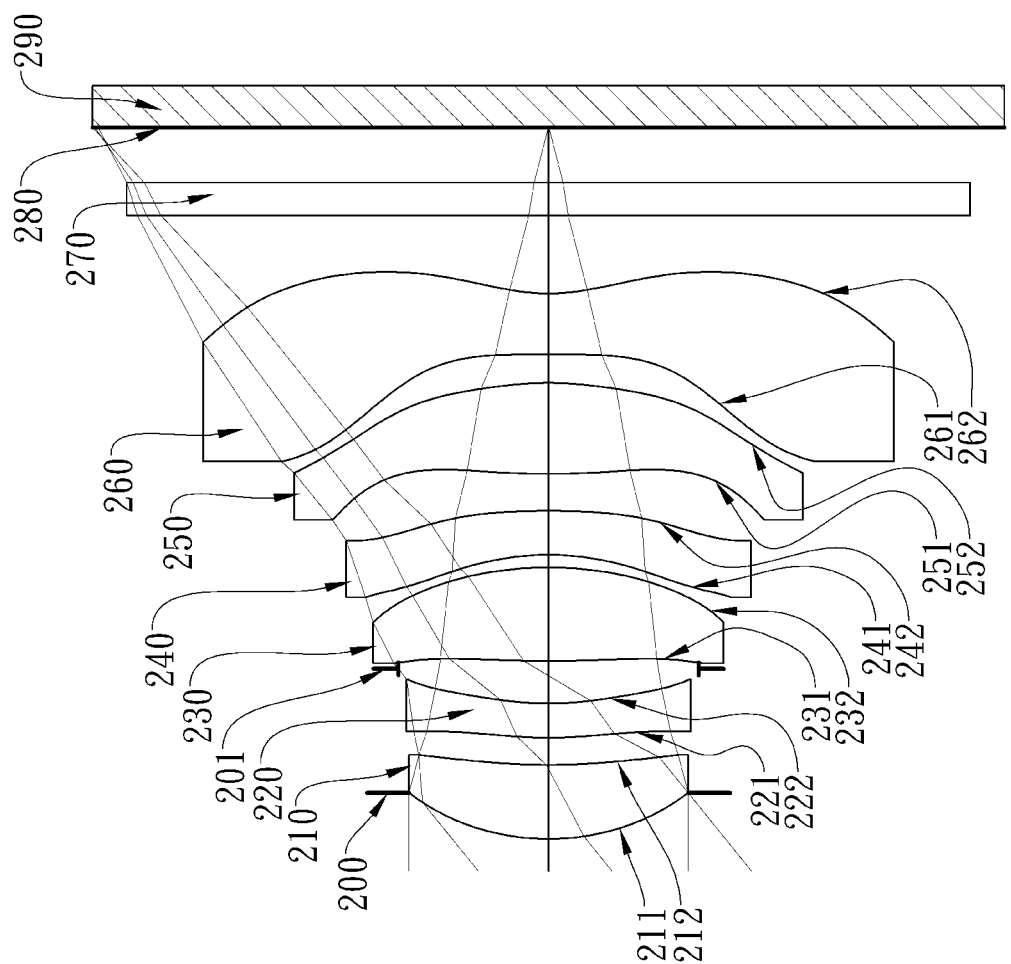
FIG. 2A is a schematic view of an imaging apparatus according to the 2nd embodiment of the present disclosure.
Figure 2B:
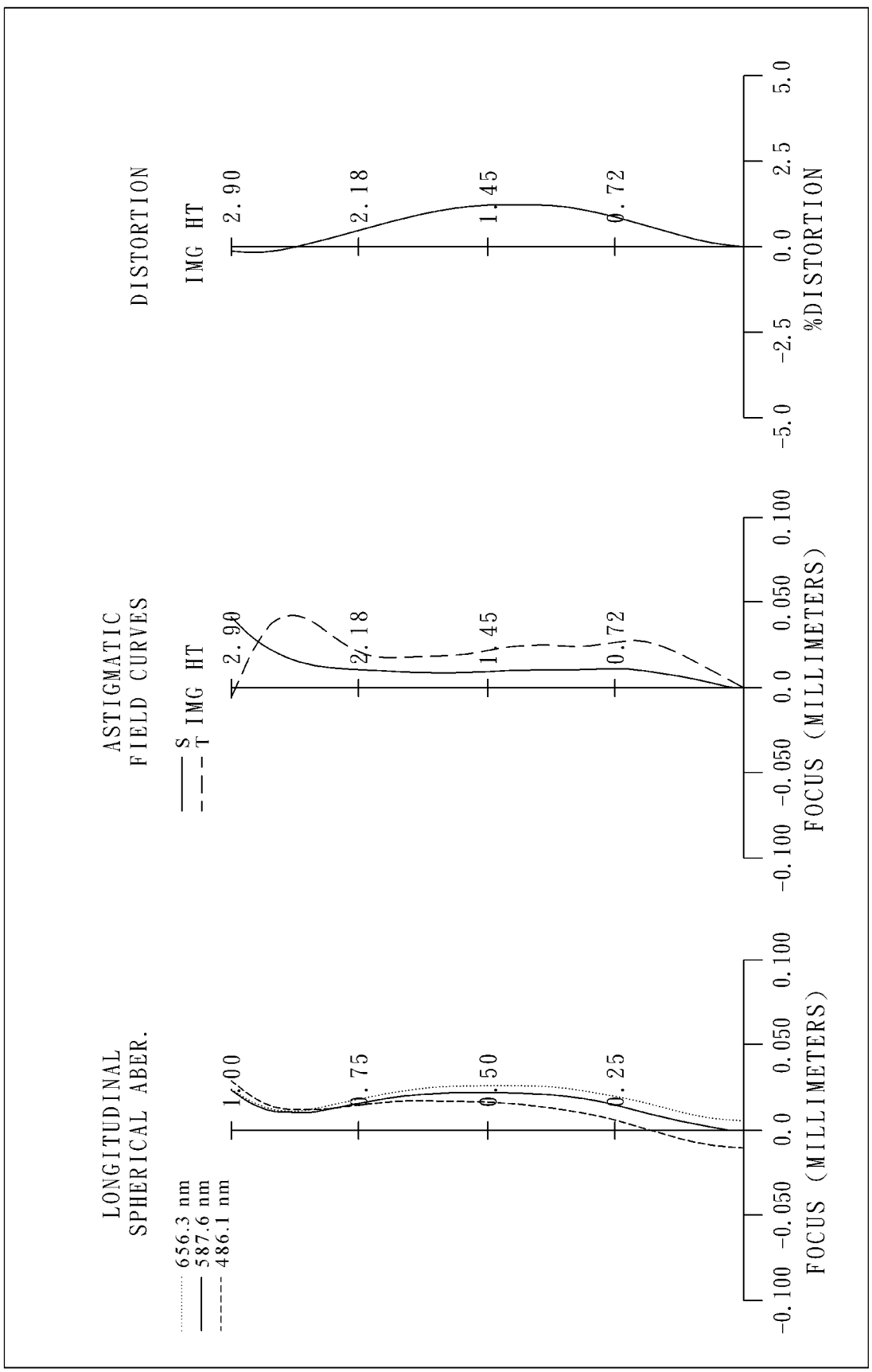
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an image capturing lens assembly (not otherwise herein labeled) of the present disclosure and an image sensor 290. The image capturing lens assembly includes, in order from an object side to an image side, an aperture stop 200, a first lens element 210, a second lens element 220, a stop 201, a third lens element 230, a fourth lens element 240, a fifth lens element 250, and a sixth lens element 260.

The first lens element 210 with positive refractive power has an object-side surface 211 being convex in a paraxial region thereof, an image-side surface 212 being concave in a paraxial region thereof, and both the object-side surface 211 and the image-side surface 212 being aspheric. The first lens element 210 is made of plastic material.

The second lens element 220 with negative refractive power has an object-side surface 221 being convex in a paraxial region thereof, an image-side surface 222 being concave in a paraxial region thereof, and both the object-side surface 221 and the image-side surface 222 being aspheric. The second lens element 220 is made of plastic material.

The third lens element 230 with positive refractive power has an object-side surface 231 being convex in a paraxial region thereof, an image-side surface 232 being convex in a paraxial region thereof, both the object-side surface 231 and the image-side surface 232 being aspheric, and at least one concave critical point in an off-axial region of the object-side surface 231 thereof. The third lens element 230 is made of plastic material.

The fourth lens element 240 with negative refractive power has an object-side surface 241 being concave in a paraxial region thereof, an image-side surface 242 being convex in a paraxial region thereof, and both the object-side surface 241 and the image-side surface 242 being aspheric. The fourth lens element 240 is made of plastic material.

The fifth lens element 250 with positive refractive power has an object-side surface 251 being convex in a paraxial region thereof, an image-side surface 252 being convex in a paraxial region thereof, both the object-side surface 251 and the image-side surface 252 being aspheric, and at least one concave critical point in an off-axial region of the object-side surface 251 thereof. The fifth lens element 250 is made of plastic material.

The sixth lens element 260 with negative refractive power has an object-side surface 261 being concave in a paraxial region thereof, an image-side surface 262 being concave in a paraxial region thereof, both the object-side surface 261 and the image-side surface 262 being aspheric, and at least one convex critical point in an off-axial region of the image-side surface 262 thereof. The sixth lens element 260 is made of plastic material.

The image capturing lens assembly further includes an IR cut filter 270 located between the sixth lens element 260 and an image surface 280. The IR cut filter 270 is made of glass material and will not affect the focal length of the image capturing lens assembly. The image sensor 290 is disposed on or near the image surface 280 of the image capturing lens assembly.

The detailed optical data of the 2nd embodiment are shown in TABLE 3, and the aspheric surface data are shown in TABLE 4, wherein the units of the curvature radius, the thickness and the focal length are expressed in mm, and HFOV is a half of the maximal field of view.

TABLE 3

(2nd Embodiment)
f = 3.57 mm, Fno = 2.00, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.295 | | | | |
| 2 | Lens 1 | 1.530 | ASP | 0.473 | Plastic | 1.544 | 55.9 | 4.50 |
| 3 | | 3.645 | ASP | 0.174 | | | | |
| 4 | Lens 2 | 2.527 | ASP | 0.220 | Plastic | 1.639 | 23.5 | −15.56 |
| 5 | | 1.946 | ASP | 0.222 | | | | |
| 6 | Stop | Plano | | 0.049 | | | | |
| 7 | Lens 3 | 8.073 | ASP | 0.599 | Plastic | 1.544 | 55.9 | 3.11 |
| 8 | | −2.081 | ASP | 0.081 | | | | |
| 9 | Lens 4 | −1.615 | ASP | 0.280 | Plastic | 1.671 | 19.3 | −3.48 |
| 10 | | −5.614 | ASP | 0.237 | | | | |
| 11 | Lens 5 | 5.097 | ASP | 0.582 | Plastic | 1.671 | 19.3 | 2.27 |
| 12 | | −2.069 | ASP | 0.182 | | | | |
| 13 | Lens 6 | −41.579 | ASP | 0.390 | Plastic | 1.639 | 23.5 | −1.82 |
| 14 | | 1.201 | ASP | 0.500 | | | | |
| 15 | IR Cut Filter | Plano | | 0.210 | Glass | 1.517 | 64.2 | — |
| 16 | | Plano | | 0.352 | | | | |
| 17 | Image Surface | Plano | | — | | | | |

Reference wavelength is d-line 587.6 nm.
The effective radius of Surface 6 is 0.960 mm.

TABLE 4

Aspheric Coefficients

| | Surface # | | | |
|---|---|---|---|---|
| | 2 | 3 | 4 | 5 |
| k= | 8.1343E−01 | −1.7102E+01 | −4.0952E+01 | −1.6551E+01 |
| A4= | −2.6567E−02 | −7.9941E−02 | −4.6122E−02 | 1.3618E−02 |
| A6= | −6.5051E−03 | 1.0733E−01 | −4.7810E−01 | −3.1556E−01 |
| A8= | 6.1085E−04 | −9.4517E−02 | 1.3263E+00 | 9.2293E−01 |
| A10= | −2.4073E−02 | 7.3100E−02 | −1.6096E+00 | −1.0129E+00 |
| A12= | 2.0996E−02 | −2.8356E−02 | 9.8794E−01 | 5.6721E−01 |
| A14= | −6.8207E−03 | 1.4325E−02 | −2.5707E−01 | −1.1929E−01 |

| | Surface # | | | |
|---|---|---|---|---|
| | 7 | 8 | 9 | 10 |
| k= | 9.0860E+00 | −1.1824E+00 | −1.2211E+00 | 7.1649E+00 |
| A4= | −4.6806E−02 | 2.1261E−01 | 2.1248E−01 | −8.2776E−02 |
| A6= | −4.9427E−02 | −8.2289E−01 | −7.9203E−01 | −2.4555E−01 |
| A8= | −7.8684E−02 | 1.2845E+00 | 1.4419E+00 | 6.8582E−01 |
| A10= | 2.2727E−01 | −9.7727E−01 | −1.0643E+00 | −7.4357E−01 |
| A12= | −2.2649E−01 | 3.1434E−01 | 2.0574E−01 | 4.5664E−01 |

TABLE 4-continued

| Aspheric Coefficients | | | | |
|---|---|---|---|---|
| A14= | 9.4615E−02 | −2.7514E−02 | 1.2284E−01 | −1.5030E−01 |
| A16= | | | −5.1565E−02 | 2.0113E−02 |

| | Surface # | | | |
|---|---|---|---|---|
| | 12 | 13 | 11 | 14 |
| k= | −1.9292E+01 | −1.0000E+00 | −1.7085E+00 | −7.1753E+00 |
| A4= | 6.6513E−02 | −2.5665E−01 | −1.8818E−02 | −2.0165E−01 |
| A6= | −1.9478E−01 | −7.1654E−02 | −1.7507E−01 | 1.2849E−01 |
| A8= | 1.2264E−02 | 1.3759E−01 | 5.2411E−02 | −5.3004E−02 |
| A10= | 1.0633E−01 | −3.9309E−02 | 8.3845E−02 | 1.3833E−02 |
| A12= | −6.5224E−02 | −1.5680E−03 | −8.4125E−02 | −2.2381E−03 |
| A14= | 1.5540E−02 | 2.1940E−03 | 2.7700E−02 | 2.0044E−04 |
| A16= | −1.3611E−03 | −2.5254E−04 | −2.8604E−03 | −7.3533E−06 |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in table below.

| 2nd Embodiment | | | |
|---|---|---|---|
| f [mm] | 3.57 | T12/CT2 | 0.79 |
| Fno | 2.00 | CT3/CT4 | 2.14 |
| HFOV [deg.] | 39.0 | ΣCT/ΣAT | 2.69 |
| (V1 + V3)/(V2 + V4 + V5 + V6) | 1.31 | TL/ImgH | 1.57 |
| V4 + V5 + V6 | 62.1 | f4/f2 | 0.22 |
| VN40 | 4 | \|f/f3\| + \|f/f4\| | 2.17 |
| (R9 + R10)/(R9 − R10) | 0.42 | (f/f5) + \|f/f6\| | 3.53 |
| (R11 + R12)/(R11 − R12) | 0.94 | | |

3rd Embodiment

Figure 3A:
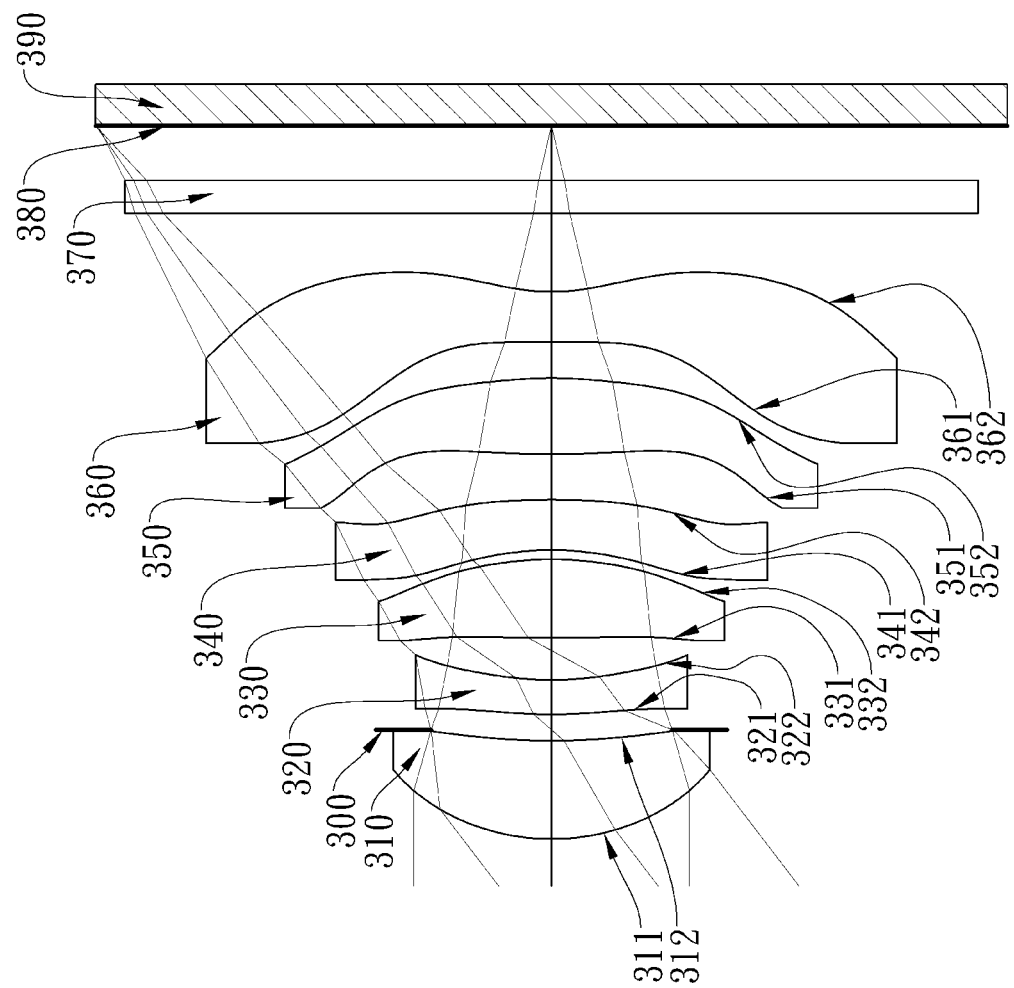
FIG. 3A is a schematic view of an imaging apparatus according to the 3rd embodiment of the present disclosure.
Figure 3B:
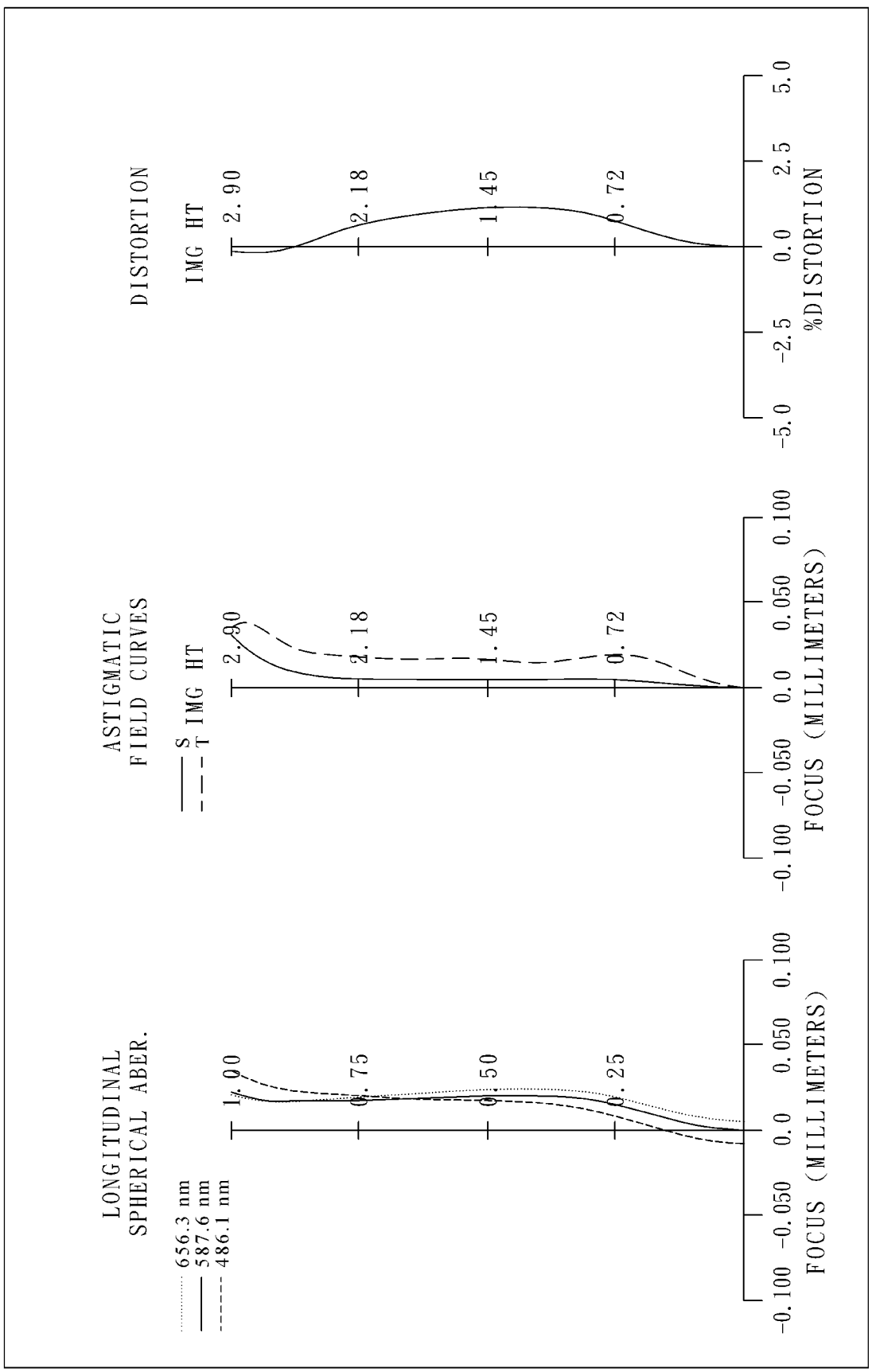
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an image capturing lens assembly (not otherwise herein labeled) of the present disclosure and an image sensor 390. The image capturing lens assembly includes, in order from an object side to an image side, a first lens element 310, an aperture stop 300, a second lens element 320, a third lens element 330, a fourth lens element 340, a fifth lens element 350, and a sixth lens element 360.

The first lens element 310 with positive refractive power has an object-side surface 311 being convex in a paraxial region thereof, an image-side surface 312 being concave in a paraxial region thereof, and both the object-side surface 311 and the image-side surface 312 being aspheric. The first lens element 310 is made of plastic material.

The second lens element 320 with negative refractive power has an object-side surface 321 being convex in a paraxial region thereof, an image-side surface 322 being concave in a paraxial region thereof, and both the object-side surface 321 and the image-side surface 322 being aspheric. The second lens element 320 is made of plastic material.

The third lens element 330 with positive refractive power has an object-side surface 331 being convex in a paraxial region thereof, an image-side surface 332 being convex in a paraxial region thereof, both the object-side surface 331 and the image-side surface 332 being aspheric, and at least one concave critical point in an off-axial region of the object-side surface 331 thereof. The third lens element 330 is made of plastic material.

The fourth lens element 340 with negative refractive power has an object-side surface 341 being concave in a paraxial region thereof, an image-side surface 342 being convex in a paraxial region thereof, and both the object-side surface 341 and the image-side surface 342 being aspheric. The fourth lens element 340 is made of plastic material.

The fifth lens element 350 with positive refractive power has an object-side surface 351 being convex in a paraxial region thereof, an image-side surface 352 being convex in a paraxial region thereof, both the object-side surface 351 and the image-side surface 352 being aspheric, and at least one concave critical point in an off-axial region of the object-side surface 351 thereof. The fifth lens element 350 is made of plastic material.

The sixth lens element 360 with negative refractive power has an object-side surface 361 being convex in a paraxial region thereof, an image-side surface 362 being concave in a paraxial region thereof, both the object-side surface 361 and the image-side surface 362 being aspheric, and at least one convex critical point in an off-axial region of the image-side surface 362 thereof. The sixth lens element 360 is made of plastic material.

The image capturing lens assembly further includes an IR cut filter 370 located between the sixth lens element 360 and an image surface 380. The IR cut filter 370 is made of glass material and will not affect the focal length of the image capturing lens assembly. The image sensor 390 is disposed on or near the image surface 380 of the image capturing lens assembly.

The detailed optical data of the 3rd embodiment are shown in TABLE 5, and the aspheric surface data are shown in TABLE 6, wherein the units of the curvature radius, the thickness and the focal length are expressed in mm, and HFOV is a half of the maximal field of view.

TABLE 5

(3rd Embodiment)
f = 3.77 mm, Fno = 2.15, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.446 | ASP | 0.625 | Plastic | 1.545 | 56.0 | 3.92 |
| 2 | | 3.790 | ASP | 0.070 | | | | |
| 3 | Ape. Stop | Plano | | 0.098 | | | | |
| 4 | Lens 2 | 2.879 | ASP | 0.220 | Plastic | 1.660 | 20.4 | −10.53 |
| 5 | | 1.974 | ASP | 0.268 | | | | |
| 6 | Lens 3 | 15.092 | ASP | 0.501 | Plastic | 1.545 | 56.0 | 3.33 |
| 7 | | −2.034 | ASP | 0.059 | | | | |
| 8 | Lens 4 | −1.809 | ASP | 0.320 | Plastic | 1.660 | 20.4 | −4.21 |
| 9 | | −5.539 | ASP | 0.291 | | | | |
| 10 | Lens 5 | 6.764 | ASP | 0.485 | Plastic | 1.639 | 23.5 | 2.96 |
| 11 | | −2.554 | ASP | 0.230 | | | | |
| 12 | Lens 6 | 95.626 | ASP | 0.320 | Plastic | 1.566 | 37.4 | −2.15 |
| 13 | | 1.202 | ASP | 0.500 | | | | |
| 14 | IR Cut Filter | Plano | | 0.210 | Glass | 1.517 | 64.2 | — |
| 15 | | Plano | | 0.346 | | | | |
| 16 | Image Surface | Plano | | — | | | | |

Reference wavelength is d-line 587.6 nm.

TABLE 6

Aspheric Coefficients

| Surface # | | | | |
|---|---|---|---|---|
| | 1 | 2 | 4 | 5 |
| k= | 4.8952E−01 | −4.8411E+00 | −5.2538E+01 | −1.5108E+01 |
| A4= | −1.4836E−02 | −7.5114E−02 | −2.8102E−02 | 4.5751E−02 |
| A6= | −4.0979E−03 | 8.1397E−02 | −4.2481E−01 | −3.0403E−01 |
| A8= | 9.1690E−03 | −1.9825E−02 | 1.2271E+00 | 1.0745E+00 |
| A10= | −2.1859E−02 | 5.3689E−03 | −1.6118E+00 | −1.5116E+00 |
| A12= | 2.1050E−02 | −2.8356E−02 | 9.8794E−01 | 1.0787E+00 |
| A14= | −6.8207E−03 | 1.4325E−02 | −2.5707E−01 | −3.0285E−01 |

| Surface # | | | | |
|---|---|---|---|---|
| | 6 | 7 | 8 | 9 |
| k= | 4.8644E+01 | −1.8102E+00 | −1.3367E+00 | 2.1588E+00 |
| A4= | −3.5746E−02 | 2.1881E−01 | 2.1099E−01 | −6.4915E−02 |
| A6= | −7.1675E−02 | −8.3260E−01 | −7.8154E−01 | −2.4568E−01 |
| A8= | −5.7011E−02 | 1.2748E+00 | 1.4454E+00 | 6.8112E−01 |
| A10= | 2.4414E−01 | −9.4349E−01 | −1.0640E+00 | −7.6323E−01 |
| A12= | −2.2649E−01 | 3.1430E−01 | 2.0572E−01 | 4.9388E−01 |
| A14= | 9.4615E−02 | −2.7514E−02 | 1.2284E−01 | −1.7162E−01 |
| A16= | | | −5.1565E−02 | 2.4045E−02 |

| Surface # | | | | |
|---|---|---|---|---|
| | 10 | 11 | 12 | 13 |
| k= | −1.6811E+00 | −1.9323E+01 | −1.0000E+00 | −7.1479E+00 |
| A4= | 3.3292E−02 | 1.9122E−01 | −2.7409E−01 | −2.2351E−01 |
| A6= | −2.8297E−01 | −4.7136E−01 | −7.5266E−02 | 1.3714E−01 |
| A8= | 1.8017E−01 | 3.9297E−01 | 1.9959E−01 | −5.3463E−02 |
| A10= | 9.2005E−03 | −1.9447E−01 | −1.0147E−01 | 1.3317E−02 |
| A12= | −8.4066E−02 | 6.4410E−02 | 2.4630E−02 | −2.1593E−03 |
| A14= | 4.5267E−02 | −1.2947E−02 | −3.0197E−03 | 2.0527E−04 |
| A16= | −7.4986E−03 | 1.1459E−03 | 1.5150E−04 | −8.2941E−06 |

In the 3rd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in table below.

| 3rd Embodiment | | | |
|---|---|---|---|
| f [mm] | 3.77 | T12/CT2 | 0.76 |
| Fno | 2.15 | CT3/CT4 | 1.57 |
| HFOV [deg.] | 37.5 | ΣCT/ΣAT | 2.43 |
| (V1 + V3)/(V2 + V4 + V5 + V6) | 1.10 | TL/ImgH | 1.57 |
| V4 + V5 + V6 | 81.3 | f4/f2 | 0.40 |
| VN40 | 4 | \|f/f3\| + \|f/f4\| | 2.03 |
| (R9 + R10)/(R9 − R10) | 0.45 | (f/f5) + \|f/f6\| | 3.03 |
| (R11 + R12)/(R11 − R12) | 1.03 | | |

4th Embodiment

Figure 4A:
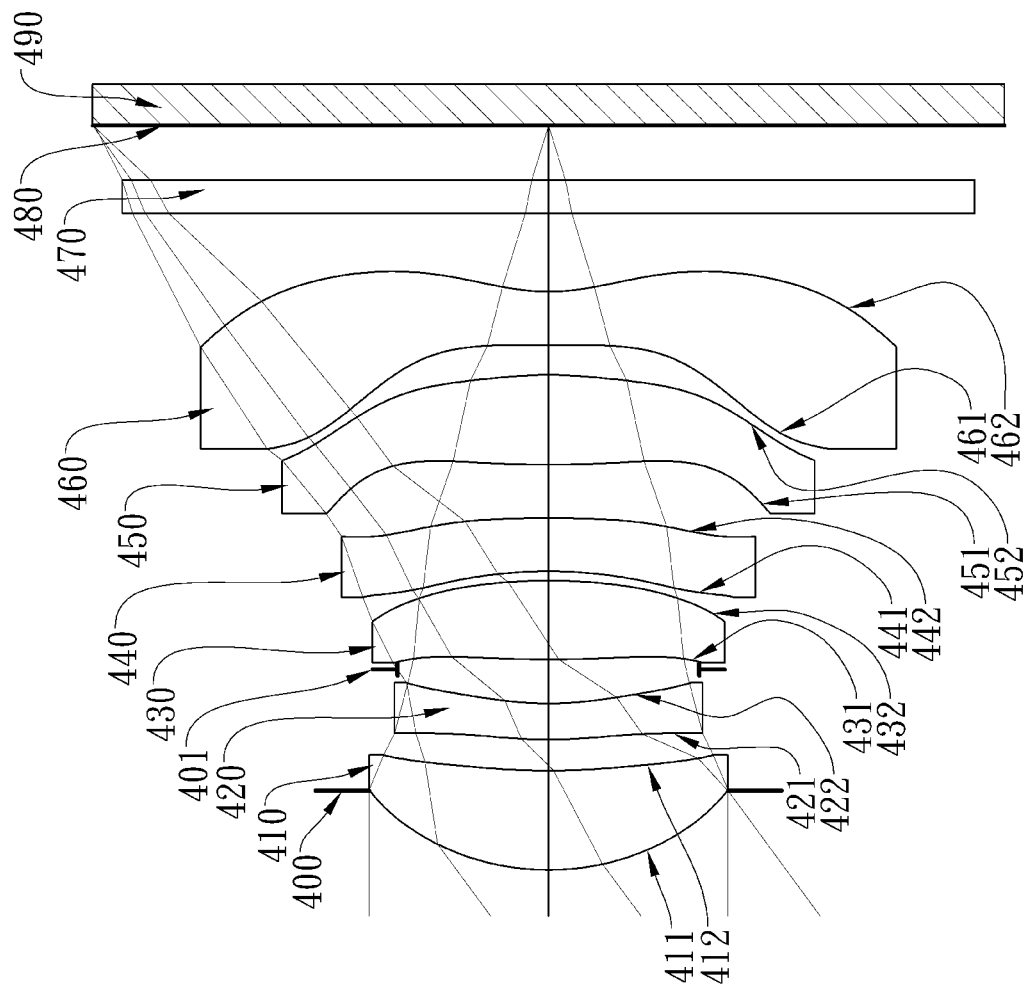
FIG. 4A is a schematic view of an imaging apparatus according to the 4th embodiment of the present disclosure.
Figure 4B:
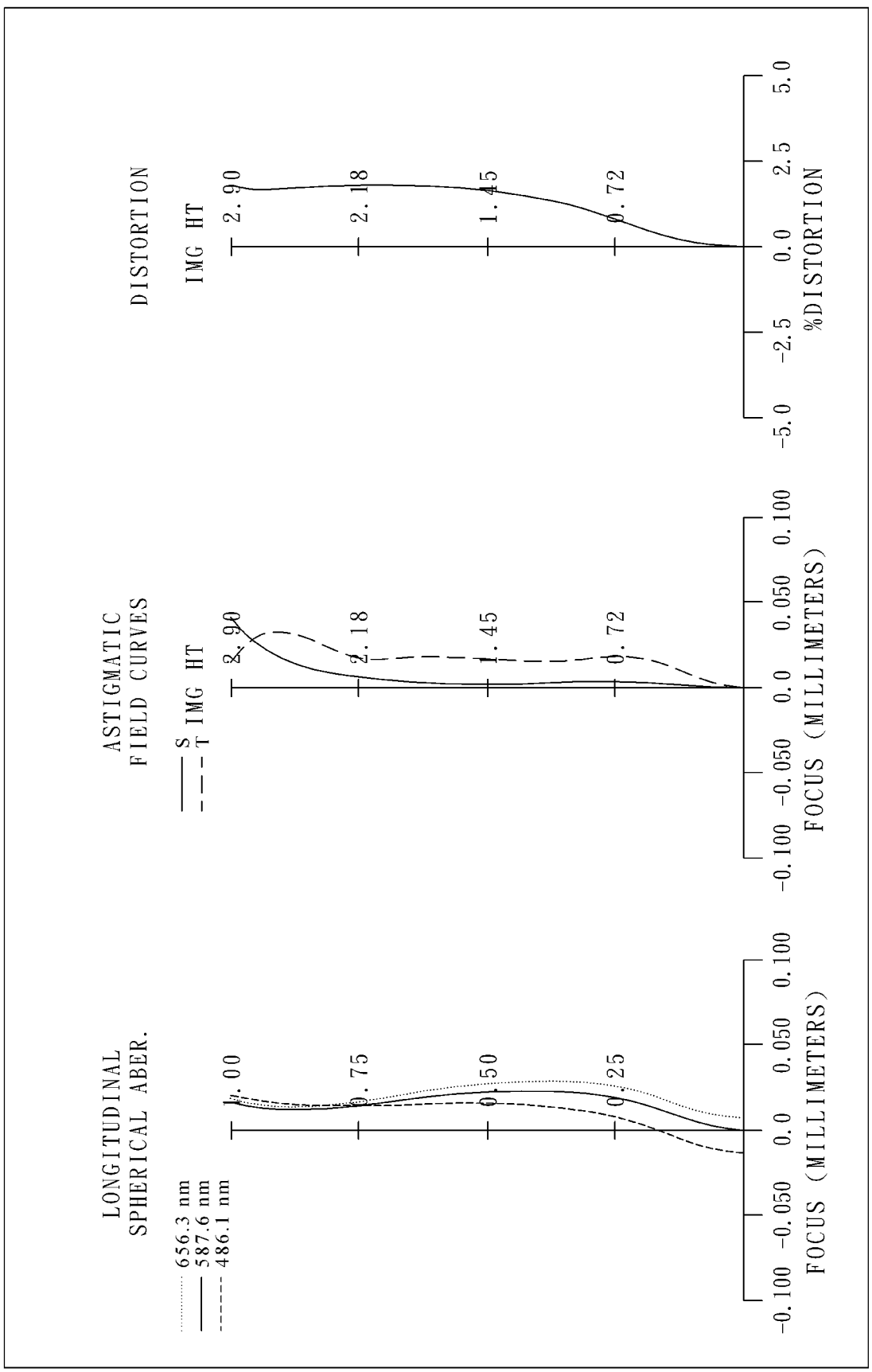
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an image capturing lens assembly (not otherwise herein labeled) of the present disclosure and an image sensor 490. The image capturing lens assembly includes, in order from an object side to an image side, an aperture stop 400, a first lens element 410, a second lens element 420, a stop 401, a third lens element 430, a fourth lens element 440, a fifth lens element 450, and a sixth lens element 460.

The first lens element 410 with positive refractive power has an object-side surface 411 being convex in a paraxial region thereof, an image-side surface 412 being concave in a paraxial region thereof, and both the object-side surface 411 and the image-side surface 412 being aspheric. The first lens element 410 is made of plastic material.

The second lens element 420 with negative refractive power has an object-side surface 421 being convex in a paraxial region thereof, an image-side surface 422 being concave in a paraxial region thereof, and both the object-side surface 421 and the image-side surface 422 being aspheric. The second lens element 420 is made of plastic material.

The third lens element 430 with positive refractive power has an object-side surface 431 being convex in a paraxial region thereof, an image-side surface 432 being convex in a paraxial region thereof, both the object-side surface 431 and the image-side surface 432 being aspheric, and at least one concave critical point in an off-axial region of the object-side surface 431 thereof. The third lens element 430 is made of plastic material.

The fourth lens element 440 with negative refractive power has an object-side surface 441 being concave in a paraxial region thereof, an image-side surface 442 being convex in a paraxial region thereof, and both the object-side surface 441 and the image-side surface 442 being aspheric. The fourth lens element 440 is made of plastic material.

The fifth lens element 450 with positive refractive power has an object-side surface 451 being convex in a paraxial region thereof, an image-side surface 452 being convex in a paraxial region thereof, both the object-side surface 451 and the image-side surface 452 being aspheric, and at least one concave critical point in an off-axial region of the object-side surface 451 thereof. The fifth lens element 450 is made of plastic material.

The sixth lens element 460 with negative refractive power has an object-side surface 461 being convex in a paraxial region thereof, an image-side surface 462 being concave in a paraxial region thereof, both the object-side surface 461 and the image-side surface 462 being aspheric, and at least one convex critical point in an off-axial region of the image-side surface 462 thereof. The sixth lens element 460 is made of plastic material.

The image capturing lens assembly further includes an IR cut filter 470 located between the sixth lens element 460 and an image surface 480. The IR cut filter 470 is made of glass material and will not affect the focal length of the image capturing lens assembly. The image sensor 490 is disposed on or near the image surface 480 of the image capturing lens assembly.

The detailed optical data of the 4th embodiment are shown in TABLE 7, and the aspheric surface data are shown in TABLE 8, wherein the units of the curvature radius, the thickness and the focal length are expressed in mm, and HFOV is a half of the maximal field of view.

TABLE 7

(4th Embodiment)
f = 3.86 mm, Fno = 1.69, HFOV = 36.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.505 | | | | |
| 2 | Lens 1 | 1.605 | ASP | 0.632 | Plastic | 1.545 | 56.1 | 4.45 |
| 3 | | 4.093 | ASP | 0.198 | | | | |
| 4 | Lens 2 | 2.688 | ASP | 0.230 | Plastic | 1.660 | 20.4 | −12.81 |
| 5 | | 1.970 | ASP | 0.216 | | | | |
| 6 | Stop | Plano | | 0.064 | | | | |
| 7 | Lens 3 | 6.974 | ASP | 0.503 | Plastic | 1.544 | 56.0 | 3.96 |
| 8 | | −3.043 | ASP | 0.059 | | | | |
| 9 | Lens 4 | −2.783 | ASP | 0.338 | Plastic | 1.660 | 20.4 | −5.74 |
| 10 | | −11.006 | ASP | 0.341 | | | | |
| 11 | Lens 5 | 7.670 | ASP | 0.572 | Plastic | 1.660 | 20.4 | 2.92 |
| 12 | | −2.493 | ASP | 0.189 | | | | |
| 13 | Lens 6 | 40.143 | ASP | 0.341 | Plastic | 1.614 | 26.0 | −2.09 |
| 14 | | 1.238 | ASP | 0.500 | | | | |

TABLE 7-continued (4th Embodiment)
f = 3.86 mm, Fno = 1.69, HFOV = 36.3 deg.

| Surface # | | Curvature Radius | Thickness | Material | Index | Abbe # | Focal Length |
|---|---|---|---|---|---|---|---|
| 15 | IR Cut Filter | Plano | 0.210 | Glass | 1.517 | 64.2 | — |
| 16 | | Plano | 0.348 | | | | |
| 17 | Image Surface | Plano | — | | | | |

Reference wavelength is d-line 587.6 nm.
The effective radius of Surface 6 is 0.960 mm.

TABLE 8

Aspheric Coefficients

| Surface # | | | | |
|---|---|---|---|---|
| | 2 | 3 | 4 | 5 |
| k= | 6.7895E−01 | −1.3146E+01 | −4.7582E+01 | −1.7389E+01 |
| A4= | −2.1378E−02 | −7.2919E−02 | −2.8453E−02 | 1.3618E−02 |
| A6= | −5.7378E−03 | 7.9642E−02 | −4.7894E−01 | −3.4709E−01 |
| A8= | 4.8694E−03 | −4.1806E−02 | 1.3007E+00 | 9.2689E−01 |
| A10= | −2.1391E−02 | 3.2104E−02 | −1.5856E+00 | −1.0255E+00 |
| A12= | 1.7658E−02 | −2.8353E−02 | 9.8796E−01 | 5.6720E−01 |
| A14= | −6.8207E−03 | 1.4325E−02 | −2.5707E−01 | −1.1929E−01 |

| Surface # | | | | |
|---|---|---|---|---|
| | 7 | 8 | 9 | 10 |
| k= | 3.6176E+01 | −2.8913E+00 | 9.3188E−01 | −8.2917E+01 |
| A4= | −4.4057E−02 | 2.1496E−01 | 1.7773E−01 | −6.5354E−02 |
| A6= | −1.0316E−01 | −8.6632E−01 | −7.7738E−01 | −2.7266E−01 |
| A8= | −3.4967E−02 | 1.3123E+00 | 1.4347E+00 | 6.9540E−01 |
| A10= | 1.9386E−01 | −9.7684E−01 | −1.0595E+00 | −7.4522E−01 |
| A12= | −2.2649E−01 | 3.1436E−01 | 2.0562E−01 | 4.5566E−01 |
| A14= | 9.4615E−02 | −2.7511E−02 | 1.2297E−01 | −1.5008E−01 |
| A16= | | | −5.1565E−02 | 2.0155E−02 |

| Surface # | | | | |
|---|---|---|---|---|
| | 11 | 12 | 13 | 14 |
| k= | 1.3501E+00 | −1.8092E+01 | −9.0000E+01 | −7.7283E+00 |
| A4= | 6.0591E−02 | 1.9586E−01 | −2.3747E−01 | −1.9117E−01 |
| A6= | −2.6699E−01 | −4.0736E−01 | −3.9418E−02 | 1.0814E−01 |
| A8= | 1.6944E−01 | 2.8574E−01 | 8.0140E−02 | −3.9011E−02 |
| A10= | −1.8324E−02 | −1.1443E−01 | −1.5420E−02 | 9.0588E−03 |
| A12= | −3.8167E−02 | 3.0077E−02 | −3.3595E−03 | −1.3704E−03 |
| A14= | 1.8586E−02 | −4.8323E−03 | 1.3791E−03 | 1.2032E−04 |
| A16= | −2.4027E−03 | 3.4705E−04 | −1.2142E−04 | −4.4143E−06 |

In the 4th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in table below.

| 4th Embodiment | | | |
|---|---|---|---|
| f [mm] | 3.86 | T12/CT2 | 0.86 |
| Fno | 1.69 | CT3/CT4 | 1.49 |
| HFOV [deg.] | 36.3 | ΣCT/ΣAT | 2.45 |
| (V1 + V3)/(V2 + V4 + V5 + V6) | 1.29 | TL/ImgH | 1.63 |

-continued

| 4th Embodiment | | | |
|---|---|---|---|
| V4 + V5 + V6 | 66.8 | f4/f2 | 0.45 |
| VN40 | 4 | \|f/f3\| + \|f/f4\| | 1.65 |
| (R9 + R10)/(R9 − R10) | 0.51 | (f/f5) + \|f/f6\| | 3.17 |
| (R11 + R12)/(R11 − R12) | 1.06 | | |

5th Embodiment

Figure 5A:
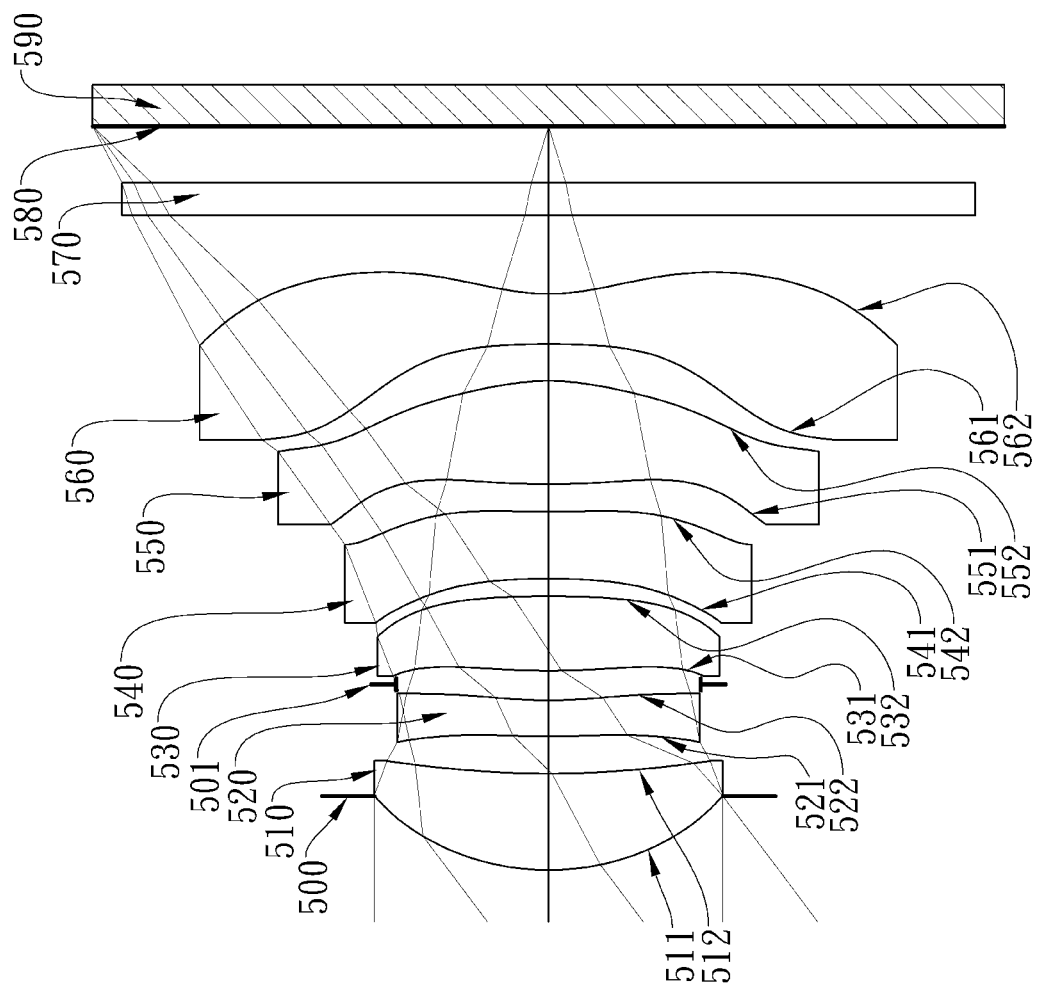
FIG. 5A is a schematic view of an imaging apparatus according to the 5th embodiment of the present disclosure.
Figure 5B:
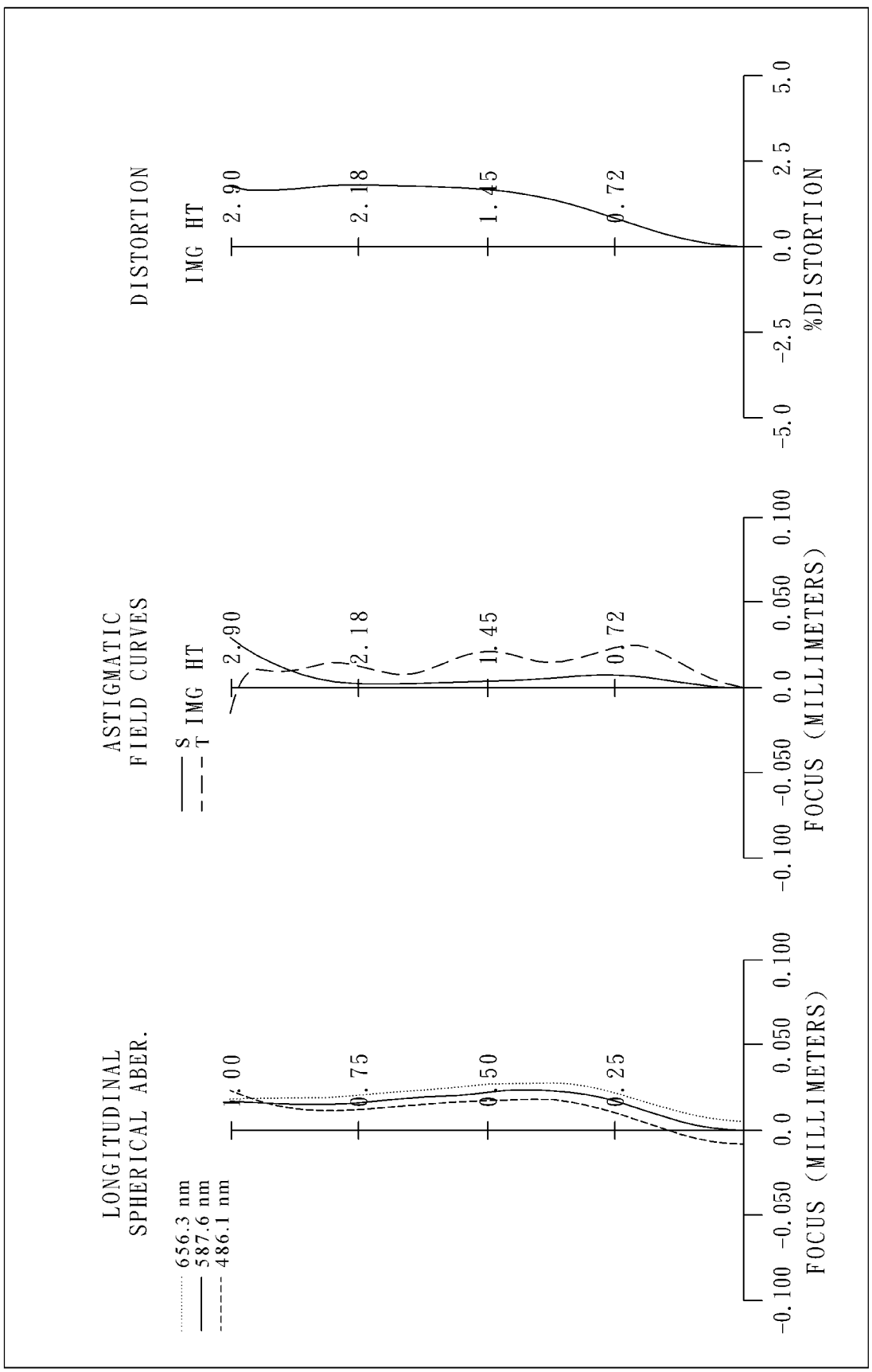
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an image capturing lens assembly (not otherwise herein labeled) of the present disclosure and an image sensor 590. The image capturing lens assembly includes, in order from an object side to an image side, an aperture stop 500, a first lens element 510, a second lens element 520, a stop 501, a third lens element 530, a fourth lens element 540, a fifth lens element 550, and a sixth lens element 560.

The first lens element 510 with positive refractive power has an object-side surface 511 being convex in a paraxial region thereof, an image-side surface 512 being concave in a paraxial region thereof, and both the object-side surface 511 and the image-side surface 512 being aspheric. The first lens element 510 is made of plastic material.

The second lens element 520 with negative refractive power has an object-side surface 521 being convex in a paraxial region thereof, an image-side surface 522 being concave in a paraxial region thereof, both the object-side surface 521 and the image-side surface 522 being aspheric, and at least one convex critical point in an off-axial region of the image-side surface 522 thereof. The second lens element 520 is made of plastic material.

The third lens element 530 with positive refractive power has an object-side surface 531 being convex in a paraxial region thereof, an image-side surface 532 being convex in a paraxial region thereof, both the object-side surface 531 and the image-side surface 532 being aspheric, and at least one concave critical point in an off-axial region of the object-side surface 531 thereof. The third lens element 530 is made of plastic material.

The fourth lens element 540 with negative refractive power has an object-side surface 541 being concave in a paraxial region thereof, an image-side surface 542 being concave in a paraxial region thereof, and both the object-side surface 541 and the image-side surface 542 being aspheric. The fourth lens element 540 is made of plastic material.

The fifth lens element 550 with positive refractive power has an object-side surface 551 being convex in a paraxial region thereof, an image-side surface 552 being convex in a paraxial region thereof, both the object-side surface 551 and the image-side surface 552 being aspheric, and at least one concave critical point in an off-axial region of the object-side surface 551 thereof. The fifth lens element 550 is made of plastic material.

The sixth lens element 560 with negative refractive power has an object-side surface 561 being concave in a paraxial region thereof, an image-side surface 562 being concave in a paraxial region thereof, both the object-side surface 561 and the image-side surface 562 being aspheric, and at least one convex critical point in an off-axial region of the image-side surface 562 thereof. The sixth lens element 560 is made of plastic material.

The image capturing lens assembly further includes an IR cut filter 570 located between the sixth lens element 560 and an image surface 580. The IR cut filter 570 is made of glass material and will not affect the focal length of the image capturing lens assembly. The image sensor 590 is disposed on or near the image surface 580 of the image capturing lens assembly.

The detailed optical data of the 5th embodiment are shown in TABLE 9, and the aspheric surface data are shown in TABLE 10, wherein the units of the curvature radius, the thickness and the focal length are expressed in mm, and HFOV is a half of the maximal field of view.

TABLE 9

(5th Embodiment)
f = 3.76 mm, Fno = 1.69, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.471 | | | | |
| 2 | Lens 1 | 1.609 | ASP | 0.614 | Plastic | 1.545 | 56.1 | 4.04 |
| 3 | | 5.160 | ASP | 0.238 | | | | |
| 4 | Lens 2 | 5.630 | ASP | 0.230 | Plastic | 1.660 | 20.4 | −8.58 |
| 5 | | 2.776 | ASP | 0.101 | | | | |
| 6 | Stop | Plano | | 0.088 | | | | |
| 7 | Lens 3 | 4.781 | ASP | 0.474 | Plastic | 1.544 | 56.0 | 5.61 |
| 8 | | −8.149 | ASP | 0.112 | | | | |
| 9 | Lens 4 | −6.339 | ASP | 0.428 | Plastic | 1.660 | 20.4 | −4.94 |
| 10 | | 6.889 | ASP | 0.176 | | | | |
| 11 | Lens 5 | 4.775 | ASP | 0.659 | Plastic | 1.614 | 26.0 | 1.91 |
| 12 | | −1.471 | ASP | 0.235 | | | | |
| 13 | Lens 6 | −5.627 | ASP | 0.320 | Plastic | 1.584 | 28.2 | −1.75 |
| 14 | | 1.280 | ASP | 0.500 | | | | |
| 15 | IR Cut Filter | Plano | | 0.210 | Glass | 1.517 | 64.2 | — |
| 16 | | Plano | | 0.359 | | | | |
| 17 | Image Surface | Plano | | — | | | | |

Reference wavelength is d-line 587.6 nm.
The effective radius of Surface 6 is 0.970 mm.

TABLE 10

Aspheric Coefficients

| | Surface # | | | |
|---|---|---|---|---|
| | 2 | 3 | 4 | 5 |
| k= | −3.7534E−01 | −3.3671E+01 | −9.0000E+01 | −1.3644E+01 |
| A4= | 1.1327E−02 | −1.8038E−02 | −2.1800E−01 | −2.2316E−01 |
| A6= | 1.4631E−02 | −3.8154E−03 | 1.1976E−01 | 1.5365E−01 |

TABLE 10-continued

| Aspheric Coefficients | | | | |
|---|---|---|---|---|
| A8= | −5.5183E−03 | 1.1631E−01 | 1.6643E−01 | −4.7849E−03 |
| A10= | 9.6629E−03 | −2.1617E−01 | −3.5207E−01 | 5.5366E−02 |
| A12= | −2.5729E−03 | 1.8849E−01 | 2.5379E−01 | −1.6629E−01 |
| A14= | 1.9754E−03 | −6.6980E−02 | −7.6095E−02 | 9.2783E−02 |

| Surface # | | | | |
|---|---|---|---|---|
| | 7 | 8 | 9 | 10 |
| k= | −1.9892E+01 | 4.0333E+01 | 2.6752E+01 | −9.0000E+01 |
| A4= | −5.3211E−02 | −6.1384E−02 | −2.6609E−01 | −2.9047E−01 |
| A6= | −9.8643E−02 | −5.5804E−02 | 4.1089E−01 | 2.3593E−01 |
| A8= | −8.8624E−02 | −5.8728E−02 | −8.9183E−01 | −3.5895E−01 |
| A10= | 4.1147E−01 | 1.8222E−01 | 1.6359E+00 | 5.6493E−01 |
| A12= | −4.8350E−01 | −1.6112E−01 | −1.7880E+00 | −5.0181E−01 |
| A14= | 1.8633E−01 | 4.7679E−02 | 1.0289E+00 | 2.2218E−01 |
| A16= | | | −2.4131E−01 | −3.7819E−02 |

| Surface # | | | | |
|---|---|---|---|---|
| | 11 | 12 | 13 | 14 |
| k= | −7.8076E+00 | −6.7798E+00 | −6.3551E+01 | −7.7097E+00 |
| A4= | −6.0301E−02 | 1.2898E−01 | −1.5906E−01 | −1.6541E−01 |
| A6= | 1.4583E−02 | −1.6680E−01 | −9.8366E−02 | 8.9961E−02 |
| A8= | −3.5450E−01 | −1.9075E−02 | 1.1967E−01 | −3.3577E−02 |
| A10= | 5.8382E−01 | 1.0642E−01 | −3.0392E−02 | 8.4557E−03 |
| A12= | −4.3338E−01 | −5.5772E−02 | −6.4868E−04 | −1.4034E−03 |
| A14= | 1.5558E−01 | 1.1775E−02 | 1.1766E−03 | 1.3221E−04 |
| A16= | −2.1579E−02 | −9.1599E−04 | −1.1807E−04 | −5.0776E−06 |

In the 5th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in table below.

| 5th Embodiment | | | |
|---|---|---|---|
| f [mm] | 3.76 | T12/CT2 | 1.03 |
| Fno | 1.69 | CT3/CT4 | 1.11 |
| HFOV [deg.] | 37.0 | ΣCT/ΣAT | 2.87 |
| (V1 + V3)/(V2 + V4 + V5 + V6) | 1.18 | TL/ImgH | 1.64 |
| V4 + V5 + V6 | 74.6 | f4/f2 | 0.58 |
| VN40 | 4 | \|f/f3\| + \|f/f4\| | 1.43 |
| (R9 + R10)/(R9 − R10) | 0.53 | (f/f5) + \|f/f6\| | 4.12 |
| (R11 + R12)/(R11 − R12) | 0.63 | | |

6th Embodiment

Figure 6A:
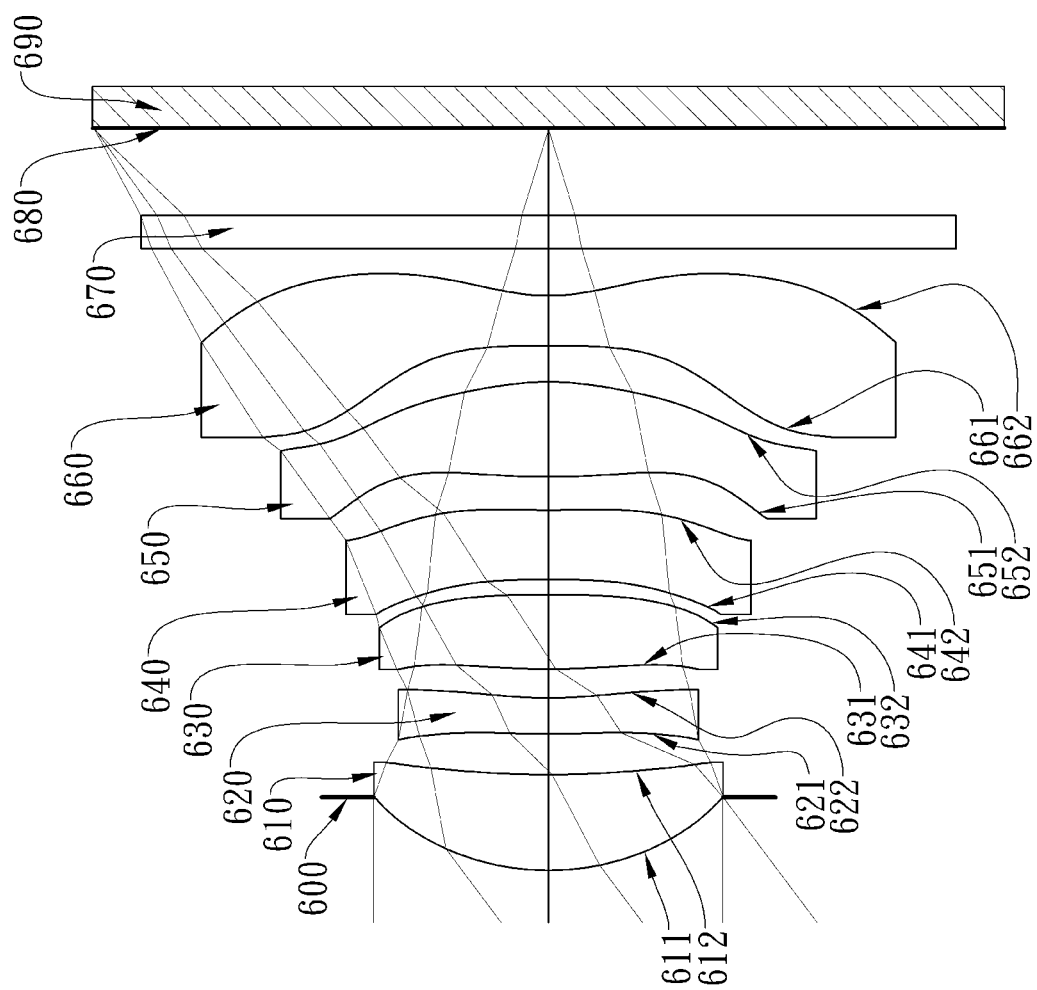
FIG. 6A is a schematic view of an imaging apparatus according to the 6th embodiment of the present disclosure.
Figure 6B:
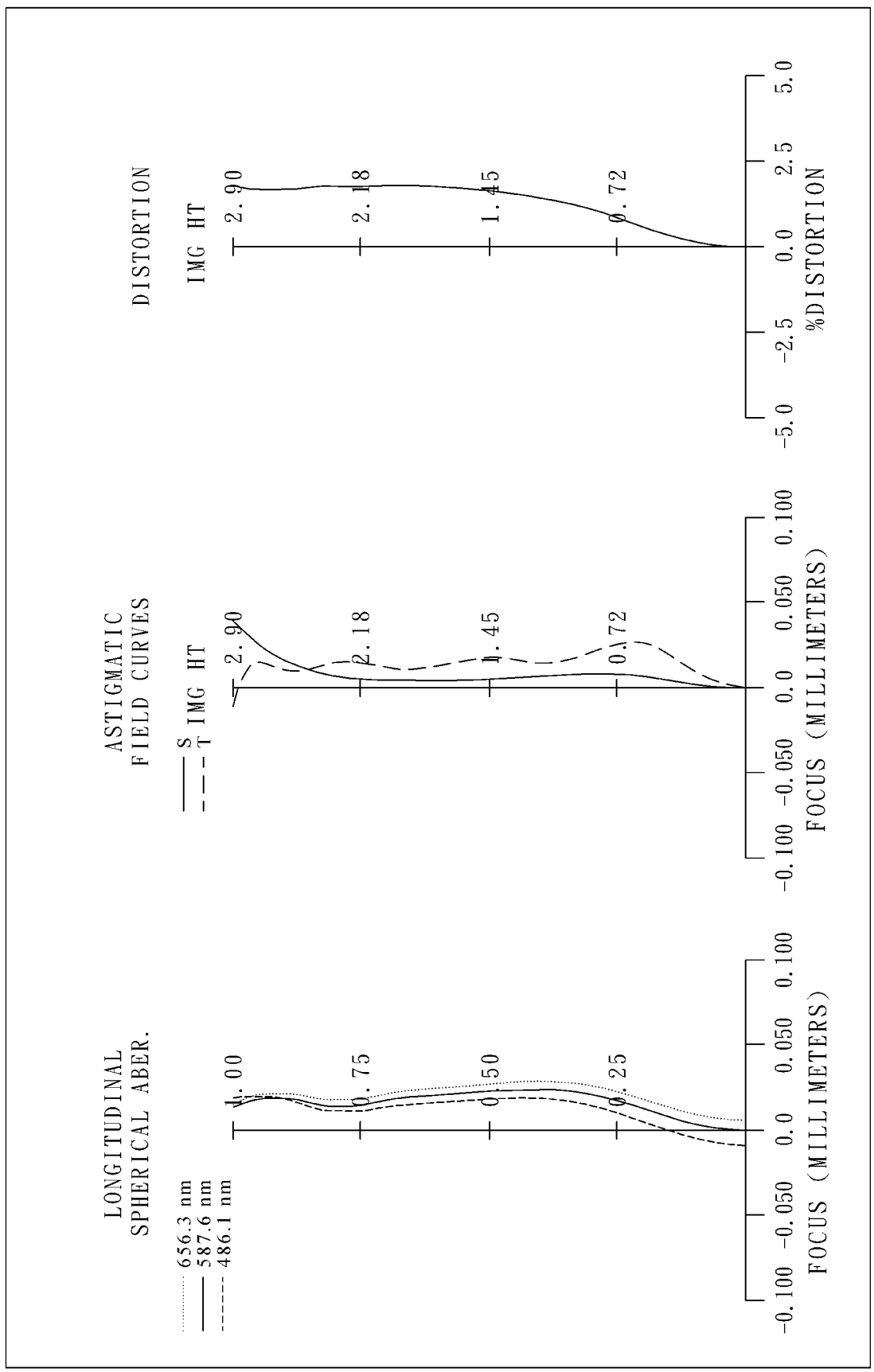
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an image capturing lens assembly (not otherwise herein labeled) of the present disclosure and an image sensor 690. The image capturing lens assembly includes, in order from an object side to an image side, an aperture stop 600, a first lens element 610, a second lens element 620, a third lens element 630, a fourth lens element 640, a fifth lens element 650, and a sixth lens element 660.

The first lens element 610 with positive refractive power has an object-side surface 611 being convex in a paraxial region thereof, an image-side surface 612 being concave in a paraxial region thereof, and both the object-side surface 611 and the image-side surface 612 being aspheric. The first lens element 610 is made of plastic material.

The second lens element 620 with negative refractive power has an object-side surface 621 being convex in a paraxial region thereof, an image-side surface 622 being concave in a paraxial region thereof, both the object-side surface 621 and the image-side surface 622 being aspheric, and at least one convex critical point in an off-axial region of the image-side surface 622 thereof. The second lens element 620 is made of plastic material.

The third lens element 630 with positive refractive power has an object-side surface 631 being convex in a paraxial region thereof, an image-side surface 632 being convex in a paraxial region thereof, both the object-side surface 631 and the image-side surface 632 being aspheric, and at least one concave critical point in an off-axial region of the object-side surface 631 thereof. The third lens element 630 is made of plastic material.

The fourth lens element 640 with negative refractive power has an object-side surface 641 being concave in a paraxial region thereof, an image-side surface 642 being concave in a paraxial region thereof, and both the object-side surface 641 and the image-side surface 642 being aspheric. The fourth lens element 640 is made of plastic material.

The fifth lens element 650 with positive refractive power has an object-side surface 651 being convex in a paraxial region thereof, an image-side surface 652 being convex in a paraxial region thereof, both the object-side surface 651 and the image-side surface 652 being aspheric, and at least one concave critical point in an off-axial region of the object-side surface 651 thereof. The fifth lens element 650 is made of plastic material.

The sixth lens element 660 with negative refractive power has an object-side surface 661 being concave in a paraxial region thereof, an image-side surface 662 being concave in a paraxial region thereof, both the object-side surface 661 and the image-side surface 662 being aspheric, and at least one convex critical point in an off-axial region of the image-side surface 662 thereof. The sixth lens element 660 is made of plastic material.

The image capturing lens assembly further includes an IR cut filter 670 located between the sixth lens element 660 and an image surface 680. The IR cut filter 670 is made of glass material and will not affect the focal length of the image capturing lens assembly. The image sensor 690 is disposed on or near the image surface 680 of the image capturing lens assembly.

The detailed optical data of the 6th embodiment are shown in TABLE 11, and the aspheric surface data are shown in TABLE 12, wherein the units of the curvature radius, the thickness and the focal length are expressed in mm, and HFOV is a half of the maximal field of view.

TABLE 11

(6th Embodiment)
f = 3.77 mm, Fno = 1.69, HFOV = 36.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.467 | | | | |
| 2 | Lens 1 | 1.625 | ASP | 0.611 | Plastic | 1.545 | 56.1 | 4.01 |
| 3 | | 5.484 | ASP | 0.260 | | | | |
| 4 | Lens 2 | 5.505 | ASP | 0.230 | Plastic | 1.660 | 20.4 | −7.38 |
| 5 | | 2.541 | ASP | 0.185 | | | | |
| 6 | Lens 3 | 4.533 | ASP | 0.475 | Plastic | 1.544 | 56.0 | 6.01 |
| 7 | | −11.301 | ASP | 0.097 | | | | |
| 8 | Lens 4 | −10.997 | ASP | 0.444 | Plastic | 1.660 | 20.4 | −7.12 |
| 9 | | 8.327 | ASP | 0.213 | | | | |
| 10 | Lens 5 | 5.016 | ASP | 0.607 | Plastic | 1.614 | 26.0 | 2.14 |
| 11 | | −1.692 | ASP | 0.231 | | | | |
| 12 | Lens 6 | −12.801 | ASP | 0.320 | Plastic | 1.584 | 28.2 | −1.87 |
| 13 | | 1.204 | ASP | 0.300 | | | | |
| 14 | IR Cut Filter | Plano | | 0.210 | Glass | 1.517 | 64.2 | — |
| 15 | | Plano | | 0.561 | | | | |
| 16 | Image Surface | Plano | | — | | | | |

Reference wavelength is d-line 587.6 nm.
The effective radius of Surface 8 is 1.100 mm.

TABLE 12

Aspheric Coefficients

| | Surface # | | | |
|---|---|---|---|---|
| | 2 | 3 | 4 | 5 |
| k= | −4.1079E−01 | −3.3563E+01 | −8.6340E+01 | −1.2098E+01 |
| A4= | 1.1506E−02 | −2.1260E−02 | −2.3663E−01 | −2.4075E−01 |
| A6= | 1.3140E−02 | 4.5367E−03 | 1.9258E−01 | 2.2517E−01 |
| A8= | −7.3636E−04 | 1.1012E−01 | 3.1058E−02 | −1.0012E−01 |
| A10= | 1.3288E−03 | −2.2093E−01 | −2.0651E−01 | 1.0429E−01 |
| A12= | 3.8008E−03 | 1.9586E−01 | 1.6940E−01 | −1.3503E−01 |
| A14= | −1.6514E−04 | −6.8723E−02 | −5.8324E−02 | 5.9224E−02 |

| | Surface # | | | |
|---|---|---|---|---|
| | 6 | 7 | 8 | 9 |
| k= | −9.0967E+00 | 7.2757E+01 | 5.1291E+01 | −9.0000E+01 |
| A4= | −6.9754E−02 | −9.6500E−02 | −2.7860E−01 | −2.6633E−01 |
| A6= | −9.7669E−02 | −3.3088E−02 | 3.6712E−01 | 1.3029E−01 |
| A8= | 1.7092E−01 | −5.5412E−02 | −7.6254E−01 | −8.4354E−02 |
| A10= | 1.8046E−01 | 2.8369E−01 | 1.5183E+00 | 1.9910E−01 |
| A12= | −2.2469E−01 | −2.8650E−01 | −1.6745E+00 | −2.2615E−01 |
| A14= | 8.0566E−02 | 8.5033E−02 | 9.1750E−01 | 1.1230E−01 |
| A16= | | | −2.0276E−01 | −2.0184E−02 |

| | Surface # | | | |
|---|---|---|---|---|
| | 10 | 11 | 12 | 13 |
| k= | −8.2036E+00 | −7.5595E+00 | −4.5348E+01 | −7.2055E+00 |
| A4= | −2.4576E−02 | 1.7414E−01 | −2.0867E−01 | −1.9277E−01 |
| A6= | −1.0366E−01 | −3.0026E−01 | −6.0233E−02 | 1.2088E−01 |
| A8= | −1.6681E−01 | 1.3146E−01 | 1.2711E−01 | −5.0496E−02 |

TABLE 12-continued

| Aspheric Coefficients | | | | |
|---|---|---|---|---|
| A10= | 3.9992E−01 | 1.6032E−02 | −4.9434E−02 | 1.3798E−02 |
| A12= | −3.2285E−01 | −2.5694E−02 | 7.7273E−03 | −2.4028E−03 |
| A14= | 1.1960E−01 | 6.5651E−03 | −3.7290E−04 | 2.3573E−04 |
| A16= | −1.6817E−02 | −5.5051E−04 | −1.1226E−05 | −9.6355E−06 |

In the 6th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in table below.

| 6th Embodiment | | | |
|---|---|---|---|
| f [mm] | 3.77 | T12/CT2 | 1.13 |
| Fno | 1.69 | CT3/CT4 | 1.07 |
| HFOV [deg.] | 36.9 | ΣCT/ΣAT | 2.73 |
| (V1 + V3)/(V2 + V4 + V5 + V6) | 1.18 | TL/ImgH | 1.64 |
| V4 + V5 + V6 | 74.6 | f4/f2 | 0.96 |
| VN40 | 4 | \|f/f3\| + \|f/f4\| | 1.16 |
| (R9 + R10)/(R9 − R10) | 0.50 | (f/f5) + \|f/f6\| | 3.78 |
| (R11 + R12)/(R11 − R12) | 0.83 | | |

7th Embodiment

Figure 7A:
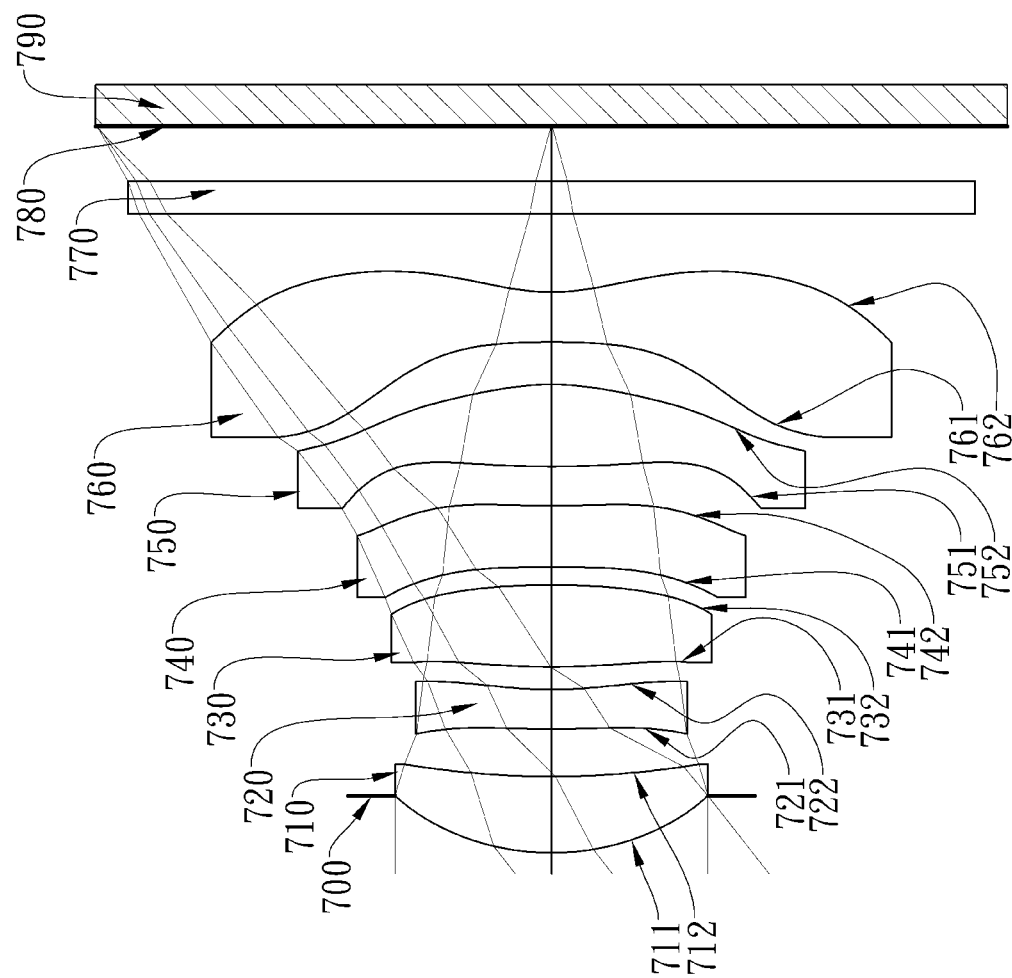
FIG. 7A is a schematic view of an imaging apparatus according to the 7th embodiment of the present disclosure.
Figure 7B:
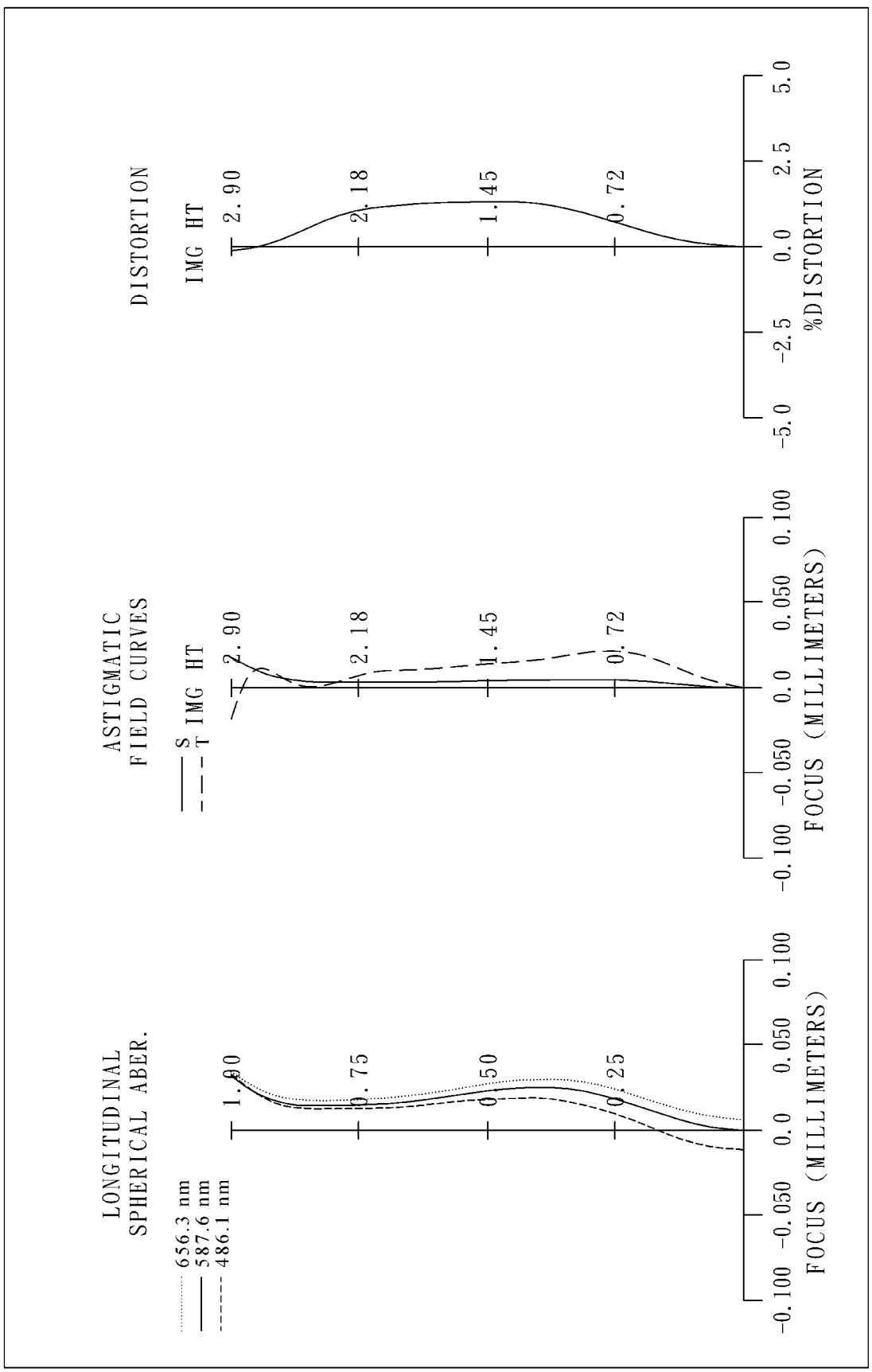
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes an image capturing lens assembly (not otherwise herein labeled) of the present disclosure and an image sensor 790. The image capturing lens assembly includes, in order from an object side to an image side, an aperture stop 700, a first lens element 710, a second lens element 720, a third lens element 730, a fourth lens element 740, a fifth lens element 750, and a sixth lens element 760.

The first lens element 710 with positive refractive power has an object-side surface 711 being convex in a paraxial region thereof, an image-side surface 712 being concave in a paraxial region thereof, and both the object-side surface 711 and the image-side surface 712 being aspheric. The first lens element 710 is made of plastic material.

The second lens element 720 with negative refractive power has an object-side surface 721 being convex in a paraxial region thereof, an image-side surface 722 being concave in a paraxial region thereof, both the object-side surface 721 and the image-side surface 722 being aspheric, and at least one convex critical point in an off-axial region of the image-side surface 722 thereof. The second lens element 720 is made of plastic material.

The third lens element 730 with positive refractive power has an object-side surface 731 being convex in a paraxial region thereof, an image-side surface 732 being convex in a paraxial region thereof, both the object-side surface 731 and the image-side surface 732 being aspheric, and at least one concave critical point in an off-axial region of the object-side surface 731 thereof. The third lens element 730 is made of plastic material.

The fourth lens element 740 with negative refractive power has an object-side surface 741 being convex in a paraxial region thereof, an image-side surface 742 being concave in a paraxial region thereof, and both the object-side surface 741 and the image-side surface 742 being aspheric. The fourth lens element 740 is made of plastic material.

The fifth lens element 750 with positive refractive power has an object-side surface 751 being convex in a paraxial region thereof, an image-side surface 752 being convex in a paraxial region thereof, both the object-side surface 751 and the image-side surface 752 being aspheric, and at least one concave critical point in an off-axial region of the object-side surface 751 thereof. The fifth lens element 750 is made of plastic material.

The sixth lens element 760 with negative refractive power has an object-side surface 761 being concave in a paraxial region thereof, an image-side surface 762 being concave in a paraxial region thereof, both the object-side surface 761 and the image-side surface 762 being aspheric, and at least one convex critical point in an off-axial region of the image-side surface 762 thereof. The sixth lens element 760 is made of plastic material.

The image capturing lens assembly further includes an IR cut filter 770 located between the sixth lens element 760 and an image surface 780. The IR cut filter 770 is made of glass material and will not affect the focal length of the image capturing lens assembly. The image sensor 790 is disposed on or near the image surface 780 of the image capturing lens assembly.

The detailed optical data of the 7th embodiment are shown in TABLE 13, and the aspheric surface data are shown in TABLE 14, wherein the units of the curvature radius, the thickness and the focal length are expressed in mm, and HFOV is a half of the maximal field of view.

TABLE 13

(7th Embodiment)
f = 3.70 mm, Fno = 1.85, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.364 | | | | |
| 2 | Lens 1 | 1.616 | ASP | 0.487 | Plastic | 1.545 | 56.1 | 4.23 |

TABLE 13-continued (7th Embodiment)
f = 3.70 mm, Fno = 1.85, HFOV = 38.0 deg.

| Surface # | | Curvature Radius | | Thickness | Material | Index | Abbe # | Focal Length |
|---|---|---|---|---|---|---|---|---|
| 3 | | 4.827 | ASP | 0.304 | | | | |
| 4 | Lens 2 | 5.314 | ASP | 0.253 | Plastic | 1.660 | 20.4 | −6.93 |
| 5 | | 2.411 | ASP | 0.146 | | | | |
| 6 | Lens 3 | 4.897 | ASP | 0.523 | Plastic | 1.534 | 55.9 | 5.23 |
| 7 | | −6.265 | ASP | 0.114 | | | | |
| 8 | Lens 4 | 96.887 | ASP | 0.393 | Plastic | 1.660 | 20.4 | −8.23 |
| 9 | | 5.134 | ASP | 0.252 | | | | |
| 10 | Lens 5 | 6.466 | ASP | 0.526 | Plastic | 1.614 | 26.0 | 2.13 |
| 11 | | −1.592 | ASP | 0.271 | | | | |
| 12 | Lens 6 | −5.609 | ASP | 0.320 | Plastic | 1.582 | 30.2 | −1.78 |
| 13 | | 1.297 | ASP | 0.500 | | | | |
| 14 | IR Cut Filter | Plano | | 0.210 | Glass | 1.517 | 64.2 | — |
| 15 | | Plano | | 0.350 | | | | |
| 16 | Image Surface | Plano | | — | | | | |

Reference wavelength is d-line 587.6 nm.

The effective radius of Surface 10 is 1.340 mm.

TABLE 14

Aspheric Coefficients

| Surface # | | | | |
|---|---|---|---|---|
| | 2 | 3 | 4 | 5 |
| k= | −3.6586E−01 | −2.3565E+01 | −9.0000E+01 | −1.3515E+01 |
| A4= | 1.0506E−02 | −7.7813E−03 | −2.0407E−01 | −1.8134E−01 |
| A6= | 2.2224E−02 | −2.4437E−02 | 7.0763E−02 | 1.2453E−01 |
| A8= | −2.3064E−02 | 1.5366E−01 | 1.2181E−01 | −1.3328E−01 |
| A10= | 4.7275E−02 | −2.6237E−01 | −2.5017E−01 | 2.5494E−01 |
| A12= | −3.5508E−02 | 2.2042E−01 | 1.9378E−01 | −2.8084E−01 |
| A14= | 1.4566E−02 | −7.7465E−02 | −7.2803E−02 | 1.1369E−01 |

| Surface # | | | | |
|---|---|---|---|---|
| | 6 | 7 | 8 | 9 |
| k= | 5.7035E+00 | −6.9091E+01 | −9.0000E+01 | −1.4314E+01 |
| A4= | −6.3066E−02 | −1.8824E−01 | −3.8113E−01 | −3.0915E−01 |
| A6= | 3.5897E−02 | 2.8631E−01 | 5.5418E−01 | 2.1002E−01 |
| A8= | −2.9469E−01 | −3.4841E−01 | −7.2826E−01 | −1.2865E−01 |
| A10= | 5.3940E−01 | 1.9079E−01 | 8.3343E−01 | 8.0242E−02 |
| A12= | −4.9292E−01 | −6.6305E−02 | −7.9509E−01 | −5.7048E−02 |
| A14= | 1.6951E−01 | 1.3766E−02 | 4.7171E−01 | 3.0971E−02 |
| A16= | | | −1.1782E−01 | −6.3166E−03 |

| Surface # | | | | |
|---|---|---|---|---|
| | 10 | 11 | 12 | 13 |
| k= | −4.6405E+01 | −8.5731E+00 | 3.7892E+00 | −7.7470E+00 |
| A4= | 4.2170E−02 | 1.1164E−01 | −1.5156E−01 | −1.7281E−01 |
| A6= | −1.7135E−01 | −1.5067E−01 | −1.3037E−01 | 9.4225E−02 |
| A8= | 4.5425E−02 | 5.3584E−04 | 1.9731E−01 | −3.2888E−02 |
| A10= | 4.9972E−02 | 7.3895E−02 | −8.7012E−02 | 7.2451E−03 |
| A12= | −5.8961E−02 | −4.0189E−02 | 1.8362E−02 | −1.0318E−03 |
| A14= | 2.1951E−02 | 8.6074E−03 | −1.8883E−03 | 8.3524E−05 |
| A16= | −2.4439E−03 | −6.8032E−04 | 7.4745E−05 | −2.6156E−06 |

In the 7th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in table below.

| 7th Embodiment | | | |
|---|---|---|---|
| f [mm] | 3.70 | T12/CT2 | 1.20 |
| Fno | 1.85 | CT3/CT4 | 1.33 |
| HFOV [deg.] | 38.0 | ΣCT/ΣAT | 2.30 |
| (V1 + V3)/(V2 + V4 + V5 + V6) | 1.15 | TL/ImgH | 1.60 |
| V4 + V5 + V6 | 76.6 | f4/f2 | 1.19 |
| VN40 | 4 | \|f/f3\| + \|f/f4\| | 1.16 |
| (R9 + R10)/(R9 − R10) | 0.60 | (f/f5) + \|f/f6\| | 3.82 |
| (R11 + R12)/(R11 − R12) | 0.62 | | |

8th Embodiment

Figure 8A:
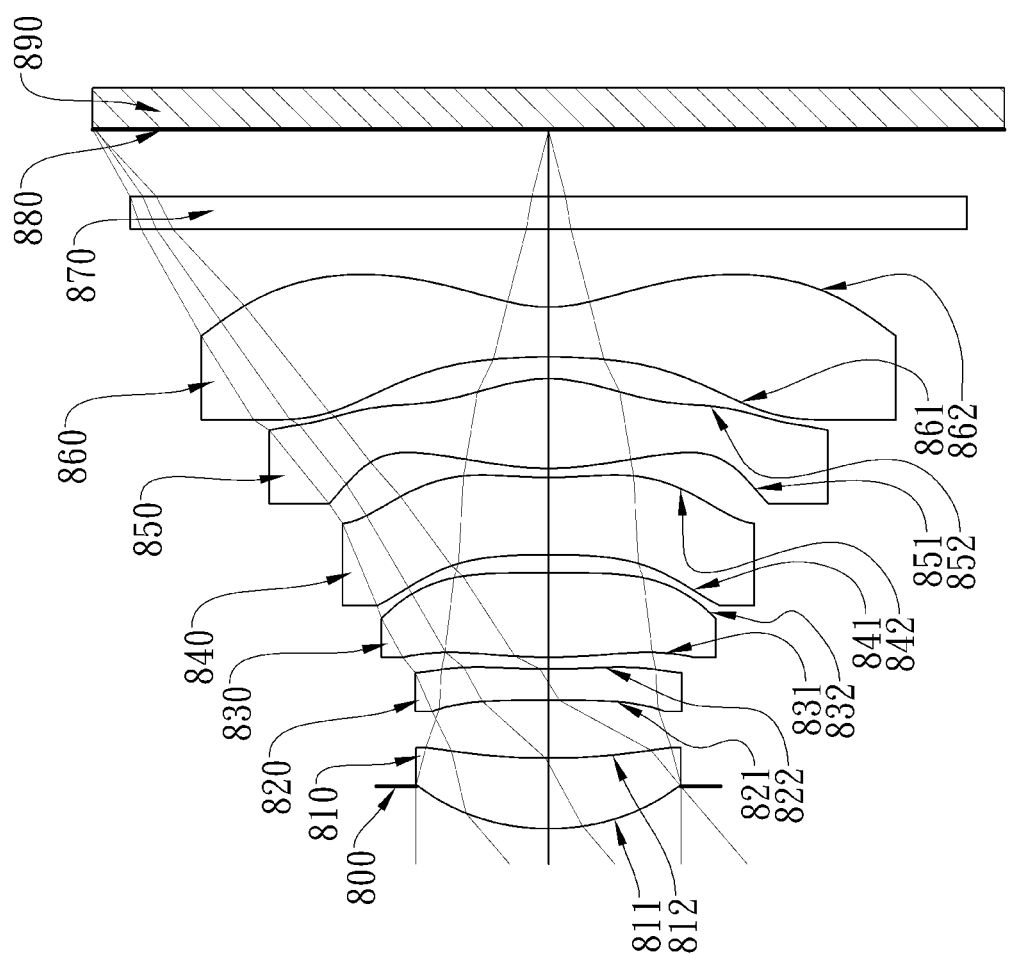
FIG. 8A is a schematic view of an imaging apparatus according to the 8th embodiment of the present disclosure.
Figure 8B:
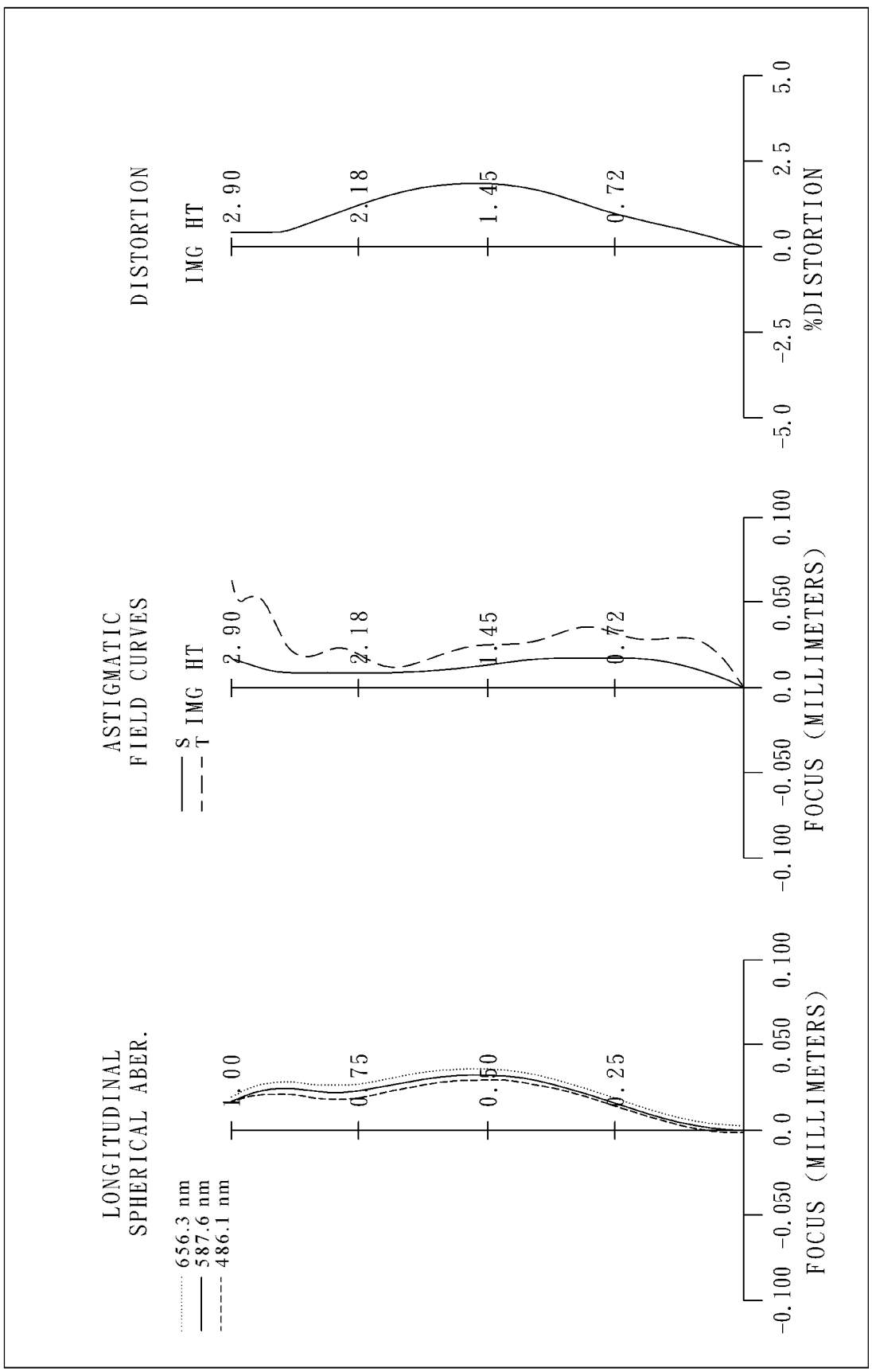
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes an image capturing lens assembly (not otherwise herein labeled) of the present disclosure and an image sensor 890. The image capturing lens assembly includes, in order from an object side to an image side, an aperture stop 800, a first lens element 810, a second lens element 820, a third lens element 830, a fourth lens element 840, a fifth lens element 850, and a sixth lens element 860.

The first lens element 810 with positive refractive power has an object-side surface 811 being convex in a paraxial region thereof, an image-side surface 812 being concave in a paraxial region thereof, and both the object-side surface 811 and the image-side surface 812 being aspheric. The first lens element 810 is made of plastic material.

The second lens element 820 with negative refractive power has an object-side surface 821 being concave in a paraxial region thereof, an image-side surface 822 being concave in a paraxial region thereof, both the object-side surface 821 and the image-side surface 822 being aspheric, and at least one convex critical point in an off-axial region of the image-side surface 822 thereof. The second lens element 820 is made of plastic material.

The third lens element 830 with positive refractive power has an object-side surface 831 being convex in a paraxial region thereof, an image-side surface 832 being concave in a paraxial region thereof, both the object-side surface 831 and the image-side surface 832 being aspheric, and at least one concave critical point in an off-axial region of the object-side surface 831 thereof. The third lens element 830 is made of plastic material.

The fourth lens element 840 with negative refractive power has an object-side surface 841 being concave in a paraxial region thereof, an image-side surface 842 being concave in a paraxial region thereof, and both the object-side surface 841 and the image-side surface 842 being aspheric. The fourth lens element 840 is made of plastic material.

The fifth lens element 850 with positive refractive power has an object-side surface 851 being convex in a paraxial region thereof, an image-side surface 852 being convex in a paraxial region thereof, both the object-side surface 851 and the image-side surface 852 being aspheric, and at least one concave critical point in an off-axial region of the object-side surface 851 thereof. The fifth lens element 850 is made of plastic material.

The sixth lens element 860 with negative refractive power has an object-side surface 861 being concave in a paraxial region thereof, an image-side surface 862 being concave in a paraxial region thereof, both the object-side surface 861 and the image-side surface 862 being aspheric, and at least one convex critical point in an off-axial region of the image-side surface 862 thereof. The sixth lens element 860 is made of plastic material.

The image capturing lens assembly further includes an IR cut filter 870 located between the sixth lens element 860 and an image surface 880. The IR cut filter 870 is made of glass material and will not affect the focal length of the image capturing lens assembly. The image sensor 890 is disposed on or near the image surface 880 of the image capturing lens assembly.

The detailed optical data of the 8th embodiment are shown in TABLE 15, and the aspheric surface data are shown in TABLE 16, wherein the units of the curvature radius, the thickness and the focal length are expressed in mm, and HFOV is a half of the maximal field of view.

TABLE 16

(8th Embodiment)
f = 3.36 mm, Fno = 1.98, HFOV = 40.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.271 | | | | |
| 2 | Lens 1 | 1.465 | ASP | 0.452 | Plastic | 1.545 | 56.1 | 3.96 |
| 3 | | 4.071 | ASP | 0.372 | | | | |
| 4 | Lens 2 | −109.274 | ASP | 0.200 | Plastic | 1.660 | 20.4 | −5.92 |
| 5 | | 4.058 | ASP | 0.076 | | | | |
| 6 | Lens 3 | 3.177 | ASP | 0.541 | Plastic | 1.544 | 56.0 | 6.01 |
| 7 | | 106.234 | ASP | 0.116 | | | | |
| 8 | Lens 4 | −8.284 | ASP | 0.496 | Plastic | 1.660 | 20.4 | −3.01 |
| 9 | | 2.680 | ASP | 0.059 | | | | |
| 10 | Lens 5 | 1.782 | ASP | 0.575 | Plastic | 1.584 | 28.2 | 1.13 |
| 11 | | −0.922 | ASP | 0.139 | | | | |
| 12 | Lens 6 | −5.077 | ASP | 0.320 | Plastic | 1.584 | 28.2 | −1.24 |
| 13 | | 0.864 | ASP | 0.500 | | | | |

TABLE 16-continued (8th Embodiment)
f = 3.36 mm, Fno = 1.98, HFOV = 40.5 deg.

| Surface # | | Curvature Radius | Thickness | Material | Index | Abbe # | Focal Length |
|---|---|---|---|---|---|---|---|
| 14 | IR Cut Filter | Plano | 0.210 | Glass | 1.517 | 64.2 | — |
| 15 | | Plano | 0.429 | | | | |
| 16 | Image Surface | Plano | — | | | | |

Reference wavelength is d-line 587.6 nm.
The effective radius of Surface 8 is 1.100 mm.

TABLE 16

Aspheric Coefficients

| Surface # | | | | |
|---|---|---|---|---|
| | 2 | 3 | 4 | 5 |
| k= | −2.8295E−01 | 5.0277E+00 | 9.0000E+01 | −4.9791E+01 |
| A4= | 2.7045E−02 | −3.5085E−03 | −2.5054E−01 | −2.8095E−01 |
| A6= | 6.2663E−04 | −6.5656E−02 | 1.1962E−01 | 2.0681E−01 |
| A8= | 6.0014E−02 | 1.8814E−01 | −1.5604E−01 | −3.0355E−01 |
| A10= | −5.0974E−02 | −3.4098E−01 | −1.1718E−02 | 3.8775E−01 |
| A12= | 3.4921E−03 | 1.9616E−01 | 1.6940E−01 | −1.3503E−01 |
| A14= | −1.6514E−04 | −6.8723E−02 | −5.8324E−02 | 5.9224E−02 |

| Surface # | | | | |
|---|---|---|---|---|
| | 6 | 7 | 8 | 9 |
| k= | −4.5735E+01 | −9.0000E+01 | 2.1064E+01 | −3.7015E+01 |
| A4= | −7.0395E−02 | −2.5100E−01 | −3.8406E−01 | −4.1680E−01 |
| A6= | −7.5283E−02 | 6.9791E−02 | 3.2646E−01 | 1.5059E−01 |
| A8= | −7.0107E−02 | −2.1901E−01 | −7.4477E−01 | −4.5296E−02 |
| A10= | 2.4679E−01 | 3.7093E−01 | 1.5573E+00 | 1.8699E−01 |
| A12= | −2.2378E−01 | −2.8652E−01 | −1.6746E+00 | −2.2615E−01 |
| A14= | 8.0566E−02 | 8.5033E−02 | 9.1738E−01 | 1.1229E−01 |
| A16= | | | −2.0276E−01 | −2.0194E−02 |

| Surface # | | | | |
|---|---|---|---|---|
| | 10 | 11 | 12 | 13 |
| k= | −8.2036E+00 | −7.6246E+00 | −4.5348E+01 | −7.1991E+00 |
| A4= | −2.1349E−01 | −7.6113E−02 | −1.5535E−01 | −1.4022E−01 |
| A6= | 3.4767E−01 | 6.9251E−01 | 3.2728E−02 | 8.5647E−02 |
| A8= | −4.2479E−01 | −9.1271E−01 | 1.6378E−02 | −4.3376E−02 |
| A10= | 3.3002E−01 | 5.3847E−01 | −3.8533E−04 | 1.5199E−02 |
| A12= | −2.2144E−01 | −1.6556E−01 | −3.5799E−03 | −3.3397E−03 |
| A14= | 8.9776E−02 | 2.5992E−02 | 1.0072E−03 | 4.0192E−04 |
| A16= | −1.3981E−02 | −1.6541E−03 | −8.3078E−05 | −1.9880E−05 |

In the 8th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in table below.

| 8th Embodiment | | | |
|---|---|---|---|
| f [mm] | 3.36 | T12/CT2 | 1.86 |
| Fno | 1.98 | CT3/CT4 | 1.09 |
| HFOV [deg.] | 40.5 | ΣCT/ΣAT | 3.39 |
| (V1 + V3)/(V2 + V4 + V5 + V6) | 1.15 | TL/ImgH | 1.55 |
| V4 + V5 + V6 | 76.8 | f4/f2 | 0.51 |
| VN40 | 4 | |f/f3| + |f/f4| | 1.68 |
| (R9 + R10)/(R9 − R10) | 0.32 | (f/f5) + |f/f6| | 5.68 |
| (R11 + R12)/(R11 − R12) | 0.71 | | |

9th Embodiment

Figure 9:
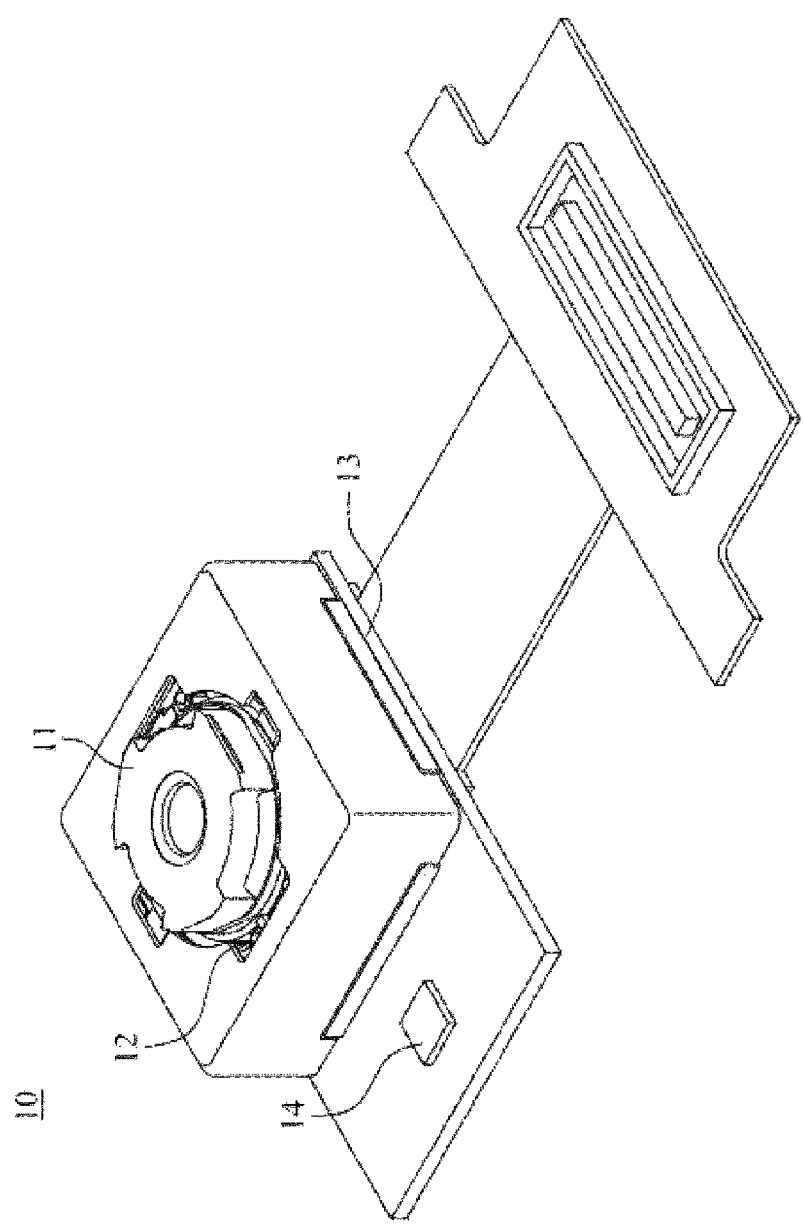
FIG. 9 is a 3-dimensional schematic view of the imaging apparatus according to the 9th embodiment.

FIG. 9 is a 3-dimensional schematic view of the imaging apparatus 10 according to the 9th embodiment. In the present embodiment, the imaging apparatus 10 is a camera module. The imaging apparatus 10 includes a lens unit 11, a driving device 12, and an image sensor 13. The lens unit 11 includes the image capturing lens assembly of the 1st embodiment described above, and a lens barrel (not otherwise labeled) for carrying the image capturing lens assembly. The imaging apparatus 10 retrieves light and generates an image by using the lens unit 11, using the driving device 12 to adjust the focus to photograph the imaged object 30 on the image sensor 13 and output the image data thereafter.

The driving device 12 may be an auto-focus module that can be driven by a voice coil motor (VCM), a micro electro-mechanical system (MEMS), a piezoelectric system, shape memory metal and other driving systems. The driving device 12 allows the lens unit 11 to obtain a better imaging position, providing a clear image of the imaged object 30 positioned in different object distances. In addition, the imaging apparatus 10 is configured to equip an image sensor 13 (e.g., CMOS, CCD) with high photosensitivity and low noise on the image surface of the image capturing lens assembly to provide high image quality obtained from the image capturing lens assembly.

The imaging apparatus 10 may further comprise an image stabilizer 14, which may be a kinetic energy sensing element such as an accelerometer, a gyroscope or a Hall Effect sensor. The image stabilizer 14 in the 9th embodiment is a gyroscope but not limited. By adjusting the image capturing lens assembly in different axial directions to provide a compensation for image blurs due to motion during exposures, the image quality under dynamic and low-light circumstances can be further improved and enhanced image compensation functions such as optical image stabilization (OIS) or electronic image stabilization (EIS) can also be provided.

10th Embodiment

Figure 10A:
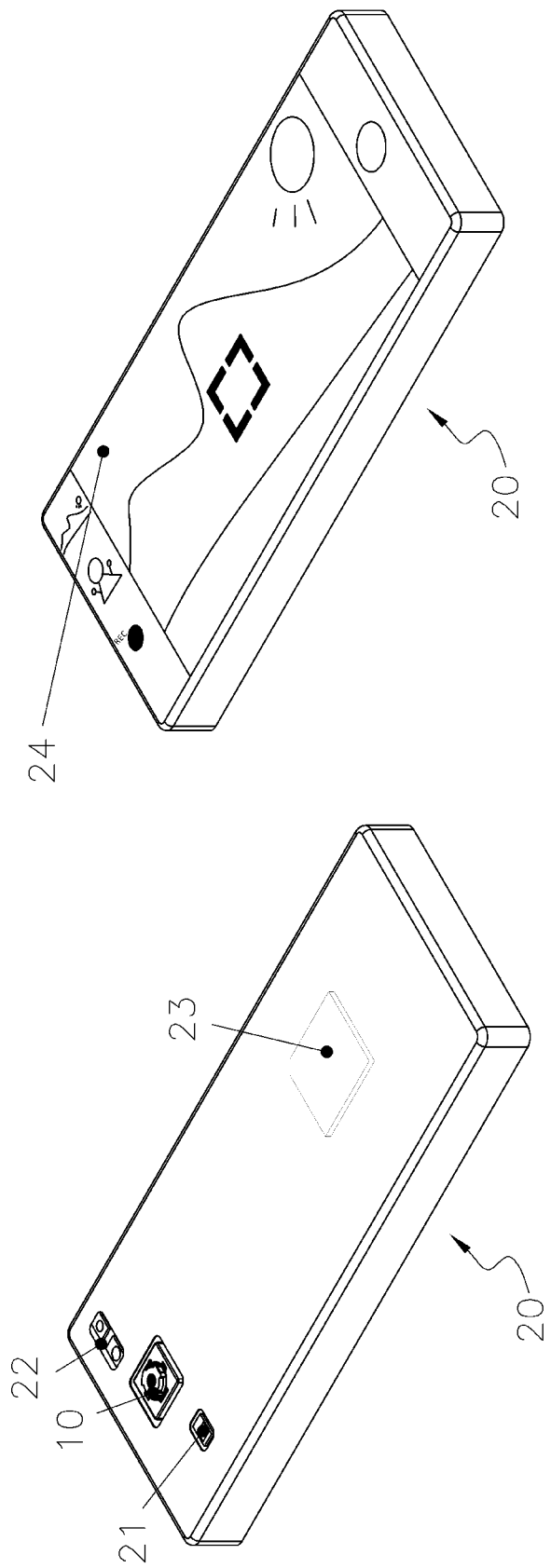
FIG. 10A is a 3-dimensional schematic view of the electronic device according to the 10th embodiment.
Figure 10B:
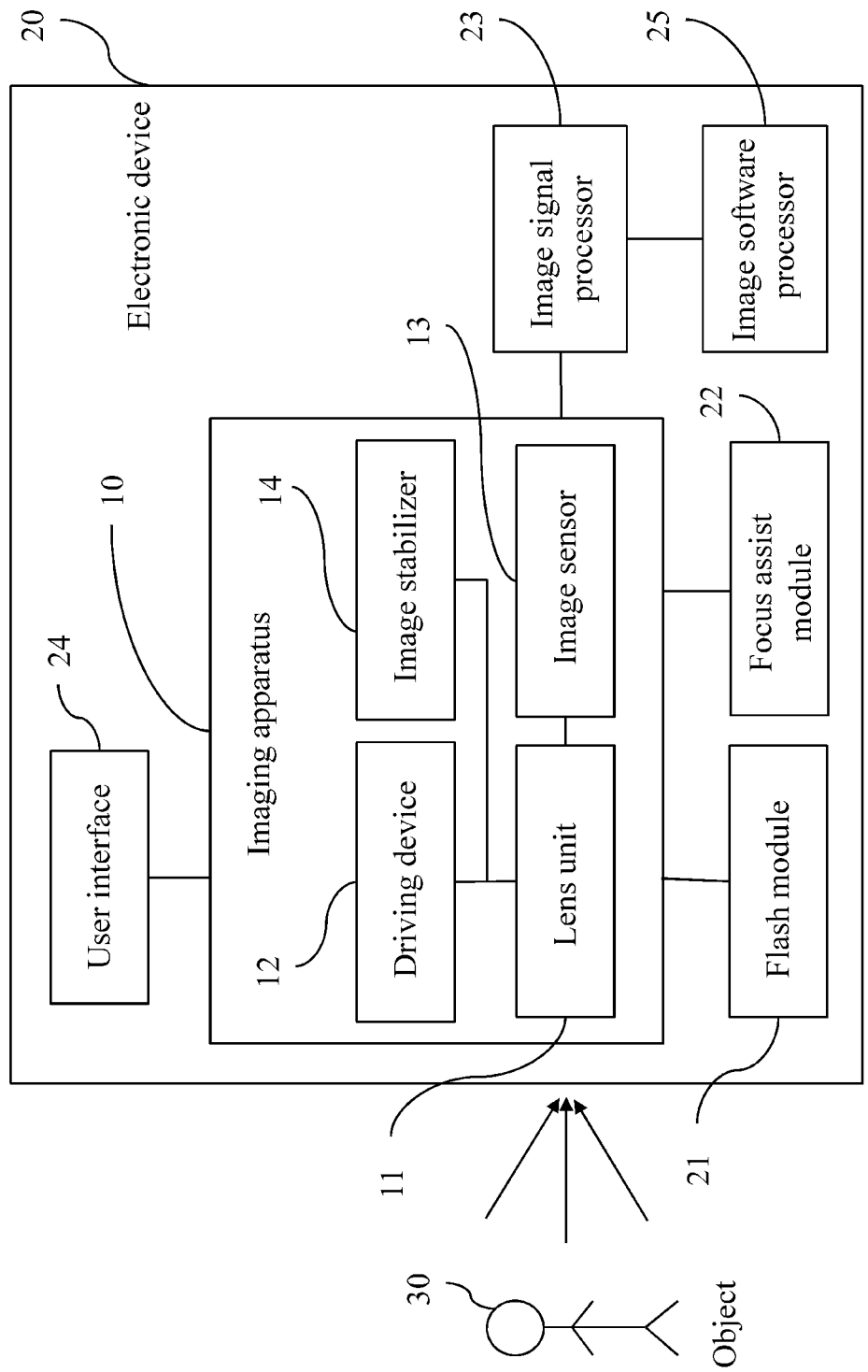
FIG. 10B is a schematic view of the electronic device according to the 10th embodiment.

Please refer to FIG. 10A and FIG. 10B. FIG. 10A is a 3-dimensional schematic view of the electronic device according to the 10th embodiment and FIG. 10B is a schematic view of the electronic device according to the 10th embodiment. In the present embodiment, the electronic device 20 is a smartphone. The electronic device 20 includes the imaging apparatus 10 of the 9th embodiment, a flash module 21, a focus assist module 22, an image signal processor 23, a user interface 24, and an image software processor 25.

When an user utilizes the user interface 24 to capture images, the electronic device 20 retrieves the light and captures an image via the imaging apparatus 10, triggering the flash module 21 to compensate insufficient light level, and focuses instantly according to the distance information of the object 30 provided by the focus assist module 22. The images are further optimized by the image signal processor 23 to further enhance the image quality generated by the image capturing lens assembly. The focus assist module 22 may adopt an infrared ray or laser focus assist system to achieve quick focusing. The user interface 24 may use a touch screen or physical buttons. Various functions of the image software processor 25 are provided to enhance image capturing and image processing.

The imaging apparatus 10 of the present invention is not limited to smartphones. The imaging apparatus 10 may be used in a system of moving focus with features in both excellent aberration correction and satisfactory image quality. For example, the imaging apparatus 10 may be applied to a variety of applications such as smart electronic products, tablet computers, wearable devices, medical devices, precision instruments, vehicle devices, surveillance cameras, portable video recorders, identification systems, multi-lens devices, somatosensory detections, virtual realities, motion devices and home intelligent auxiliary systems and other electronic devices. The aforementioned electronic apparatus is merely exemplary of practical use of the present invention and does not limit the scope of application of the imaging apparatus of the present invention.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens assembly comprising in order from an object side to an image side:
    a first lens element having an image-side surface being concave in a paraxial region thereof;
    a second lens element;
    a third lens element;
    a fourth lens element having an image-side surface being convex in a paraxial region thereof;
    a fifth lens element with positive refractive power having an object-side surface being convex in a paraxial region thereof and an image-side surface being convex in a paraxial region thereof; and
    a sixth lens element having an image-side surface being concave in a paraxial region thereof with at least one convex critical point in an off-axial region thereof, and having an object-side surface and the image-side surface being aspheric;
    wherein the image capturing lens assembly has a total of six lens elements, a focal length of the first lens element and a focal length of the second lens element have opposite signs, a focal length of the third lens element and a focal length of the fourth lens element have opposite signs, an Abbe number of the fourth lens element is V4, an Abbe number of the fifth lens element is V5, an Abbe number of the sixth lens element is V6, and the following condition is satisfied:

$V4+V5+V6<100$.

2. The image capturing lens assembly of claim 1, wherein an f-number of the image capturing lens assembly is Fno, and the following condition is satisfied:

$1.2<Fno<2.3$.

3. The image capturing lens assembly of claim 1, wherein the second lens element has an object-side surface being convex in a paraxial region thereof.

4. The image capturing lens assembly of claim 1, wherein the focal length of the first lens element and the focal length of the third lens element have the same sign.

5. The image capturing lens assembly of claim 1, wherein the fourth lens element has an object-side surface being concave in a paraxial region thereof.

6. The image capturing lens assembly of claim 1, wherein the sixth lens element has negative refractive power, a curvature radius of the object-side surface of the sixth lens element is R11, a curvature radius of the image-side surface of the sixth lens element is R12, and the following condition is satisfied:

$$0<(R11+R12)/(R11-R12)<1.5.$$

7. The image capturing lens assembly of claim 1, wherein an axial distance between an object-side surface of the first lens element and an image surface is TL, a maximum image height of the image capturing lens assembly is ImgH, and the following condition is satisfied:

$$0.80<TL/ImgH<1.80.$$

8. The image capturing lens assembly of claim 1, wherein a sum of central thicknesses of the first lens element, the second lens element, the third lens element, the fourth lens element, the fifth lens element, and the sixth lens element is $\Sigma CT$, a sum of all axial distances between adjacent lens elements of the image capturing lens assembly is $\Sigma AT$, and the following condition is satisfied:

$$2.25<\Sigma CT/\Sigma AT<4.00.$$

9. The image capturing lens assembly of claim 1, wherein an axial distance between the first lens element and the second lens element is T12, a central thickness of the second lens element is CT2, and the following condition is satisfied:

$$0.6<T12/CT2<2.5.$$

10. The image capturing lens assembly of claim 1, wherein the focal length of the first lens element is f1, a focal length of the fifth lens element is f5, and the following condition is satisfied:

$$f5<f1.$$

11. The image capturing lens assembly of claim 1, wherein the focal length of the second lens element is f2, the focal length of the fourth lens element is f4, and the following condition is satisfied:

$$0<f4/f2<1.0.$$

12. The image capturing lens assembly of claim 1, wherein a central thickness of the third lens element is CT3, a central thickness of the fourth lens element is CT4, and the following condition is satisfied:

$$CT3/CT4<1.75.$$

13. The image capturing lens assembly of claim 1, wherein a focal length of the image capturing lens assembly is f, a focal length of the fifth lens element is f5, a focal length of the sixth lens element is f6, and the following condition is satisfied:

$$2.5<(f/f5)+|f/f6|<7.0.$$

14. The image capturing lens assembly of claim 1, wherein the third lens element has an object-side surface being convex in a paraxial region thereof and having at least one concave critical point in an off-axis region thereof, the object-side surface and an image-side surface of the third lens element are both aspheric.

15. The image capturing lens assembly of claim 1, wherein the object-side surface of the fifth lens element has at least one concave critical point in an off-axial region thereof, both of the object-side surface and the image-side surface of the fifth lens element are aspheric.

16. The image capturing lens assembly of claim 1, wherein a curvature radius of the object-side surface of the fifth lens element is R9, a curvature radius of the image-side surface of the fifth lens element is R10, and the following condition is satisfied:

$$0.2<(R9+R10)/(R9-R10)<1.0.$$

17. The image capturing lens assembly of claim 1, wherein the sixth lens element has the object-side surface being concave in a paraxial region thereof.

18. The image capturing lens assembly of claim 1, wherein the sixth lens element has the object-side surface being convex in a paraxial region thereof.

19. An imaging apparatus, comprising the image capturing lens assembly of claim 1 and an image sensor disposed on an image surface of the image capturing lens assembly.

20. An electronic device, comprising the imaging apparatus of claim 19.

* * * * *